(12) United States Patent
Tang et al.

(10) Patent No.: US 12,535,659 B2
(45) Date of Patent: Jan. 27, 2026

(54) CAMERA LENS ASSEMBLY

(71) Applicant: Zhejiang Sunny Optics Co., Ltd., Yuyao (CN)

(72) Inventors: Mengna Tang, Yuyao (CN); Yifu Cheng, Yuyao (CN); Jianke Wenren, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 814 days.

(21) Appl. No.: 17/571,396

(22) Filed: Jan. 7, 2022

(65) Prior Publication Data

US 2022/0221692 A1    Jul. 14, 2022

(30) Foreign Application Priority Data

Jan. 13, 2021  (CN) .......................... 202110041226.6

(51) Int. Cl.
  *G02B 13/00*  (2006.01)
  *G02B 9/64*   (2006.01)
  *G02B 27/00*  (2006.01)

(52) U.S. Cl.
  CPC ........... *G02B 13/0045* (2013.01); *G02B 9/64* (2013.01); *G02B 27/0025* (2013.01)

(58) Field of Classification Search
  CPC .. G02B 13/0045; G02B 9/64; G02B 27/0025; G02B 13/06; G02B 13/18
  See application file for complete search history.

(56) References Cited

U.S. PATENT DOCUMENTS 5,621,575 A * 4/1997 Toyama ................. G02B 13/04
                                                     359/753
10,935,766 B2   3/2021 Hsu
                (Continued)

FOREIGN PATENT DOCUMENTS

CN   108919459 A   11/2018
CN   208705559 U    4/2019
              (Continued)

OTHER PUBLICATIONS

Herbert, Gross_2007 (Year: 2007).*
(Continued)

*Primary Examiner* — William R Alexander
*Assistant Examiner* — Gabriel A Sanz
(74) *Attorney, Agent, or Firm* — Reising Ethington P.C.

(57) ABSTRACT

A camera lens assembly is provided. The camera lens assembly along an optical axis from an object side to an image side, sequentially includes: a first lens having negative refractive power; a second lens having refractive power; a third lens having refractive power; a fourth lens having positive refractive power; a fifth lens having negative refractive power; a sixth lens having positive refractive power; and a seventh lens having negative refractive power. A distance TTL from an object-side surface of the first lens to an image plane of the camera lens assembly on the optical axis, a half of a diagonal length ImgH of an effective pixel area of the camera lens assembly and a total effective focal length f of the camera lens assembly satisfy: 15 mm<TTL× ImgH/f<18 mm; and a distortion DIST0.8F of the camera lens assembly at an 0.8 field-of-view satisfies: |DIST0.8F|<2%.

20 Claims, 14 Drawing Sheets

(56) References Cited

U.S. PATENT DOCUMENTS

| | | | |
|---|---|---|---|
| 11,231,561 B2 | 1/2022 | Shimoeda | |
| 11,340,427 B2 | 5/2022 | Wei et al. | |
| 2018/0100995 A1* | 4/2018 | Nishio | G02B 15/144511 |
| 2019/0271831 A1* | 9/2019 | Hsu | G02B 13/0045 |
| 2019/0302424 A1* | 10/2019 | Kuo | G02B 13/18 |
| 2021/0199933 A1* | 7/2021 | Wang | G02B 13/18 |

FOREIGN PATENT DOCUMENTS

| | | | |
|---|---|---|---|
| CN | 110221397 A | 9/2019 | |
| CN | 110622054 A | 12/2019 | |
| CN | 214011610 U | 8/2021 | |
| JP | 2000047108 A | 2/2000 | |
| TW | 201908798 A | 3/2019 | |
| TW | 202004249 A | 1/2020 | |

OTHER PUBLICATIONS

Field of View & Angular Field of View _ Teledyne Princeton Instruments (2020) with wayback date, https://web.archive.org/web/20200926085916/https://www.princetoninstruments.com/learn/camera-fundamentals/field-of-view-and-angular-field-of-view (Year: 2020).*

Indian Examination Report for application No. 202214000185, dated Jul. 20, 2022, 6 pages.

Chinese Office Action corresponding to application 202110041226.6, dated Dec. 29, 2021, 6 pages.

* cited by examiner

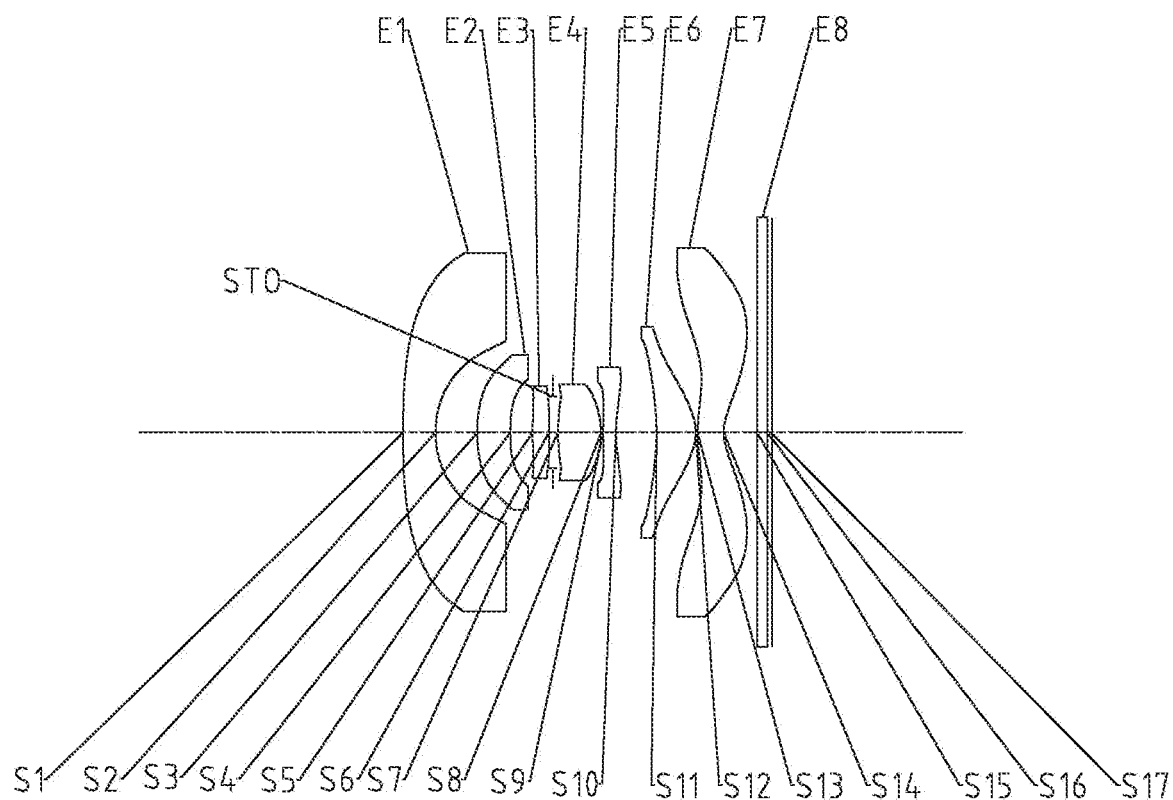
Fig. 1
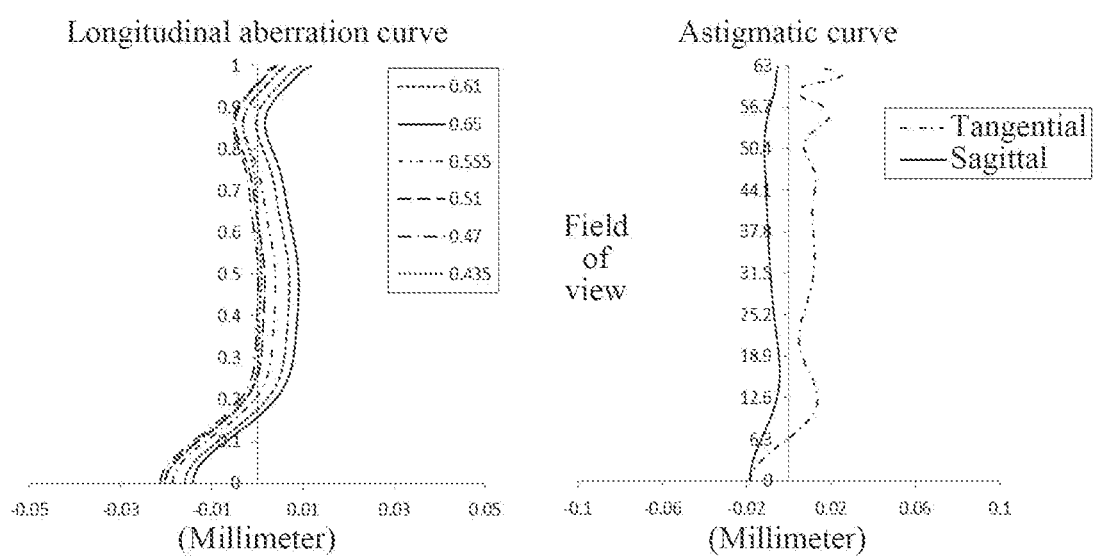
Fig. 2A                    Fig. 2B

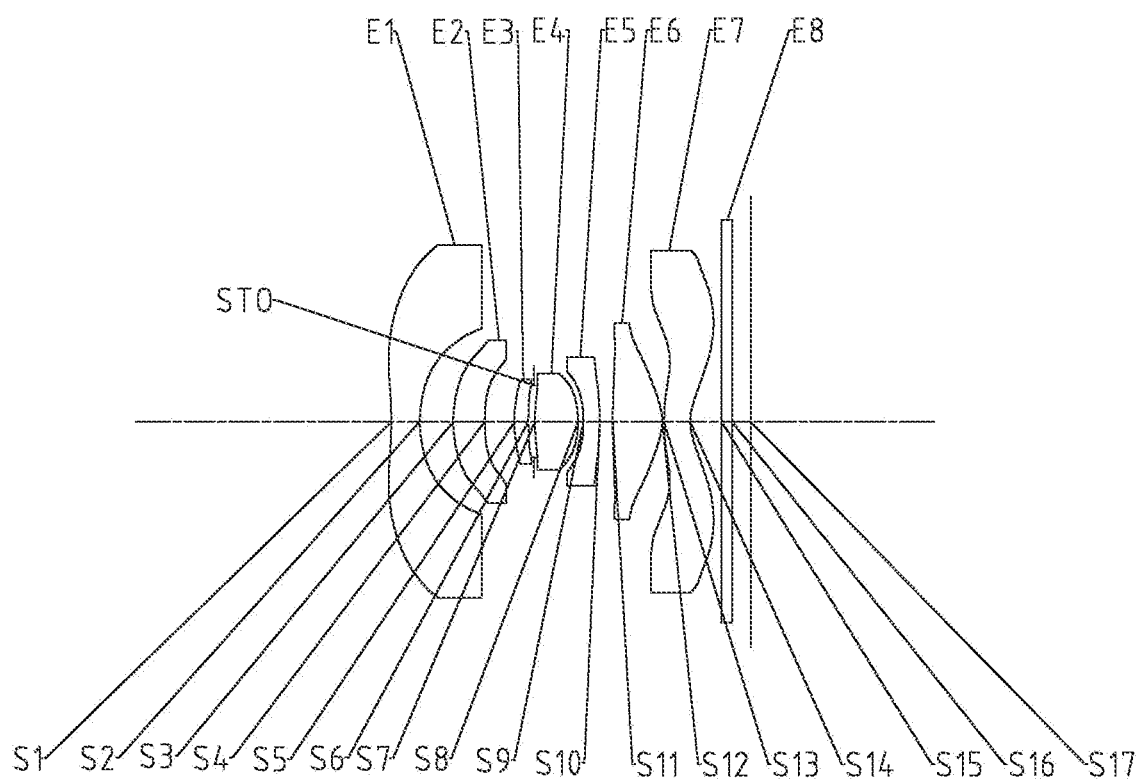
Fig. 13
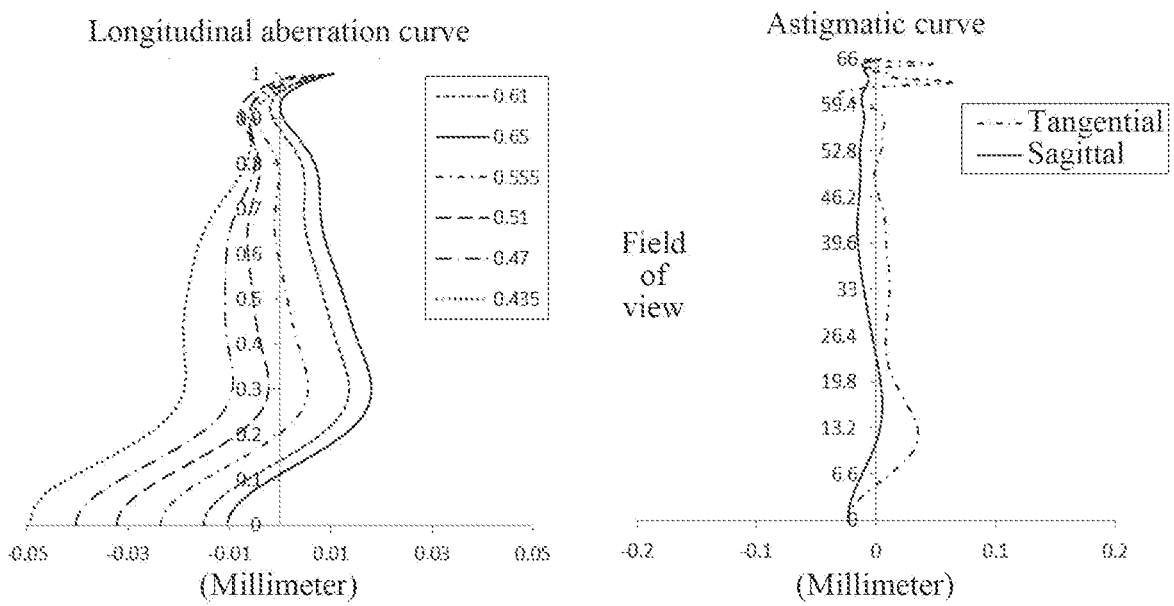
Fig. 14A                                Fig. 14B

CAMERA LENS ASSEMBLY

CROSS-REFERENCE TO RELATED APPLICATIONS

This application claims benefit of priority to Chinese Patent Application No. 202110041226.6 filed on Jan. 13, 2021 before the China National Intellectual Property Administration, the entire disclosure of which is incorporated herein by reference in its entity.

TECHNICAL FIELD

The present disclosure relates to the field of optical elements, and in particular, to a camera lens assembly.

BACKGROUND

With the continuous development of portable electronic products such as smart phones, the camera function of smart phones has become one of the main reasons for their upgrading. Therefore, the development of smart phone camera modules has become the top priority of major mobile phone manufacturers. Features such as ultra-wide-angle, telephoto, large aperture, and large image plane are slowly becoming the standard features of mobile phone photography. Therefore, a mobile phone is usually equipped with a plurality of different types of lens assemblies to achieve higher imaging effects. In particular, an ultra-wide-angle lens assembly has a wide field-of-view and may contain more scenarios in photos taken. Therefore, it plays an important role in the photography of architecture, interiors and landscapes, and has been favored by more and more consumers.

SUMMARY

One aspect of the present disclosure provides a camera lens assembly, and the camera lens assembly along an optical axis from an object side to an image side sequentially includes: a first lens having negative refractive power; a second lens having refractive power; a third lens having refractive power; a fourth lens having positive refractive power; a fifth lens having negative refractive power; a sixth lens having positive refractive power; and a seventh lens having negative refractive power. A distance TTL from an object-side surface of the first lens to an image plane of the camera lens assembly on the optical axis, a half of a diagonal length ImgH of an effective pixel area of the camera lens assembly and a total effective focal length f of the camera lens assembly may satisfy: 15 mm<TTL×ImgH/f<18 mm; and a distortion DIST0.8F of the camera lens assembly at an 0.8 field-of-view may satisfy: |DIST0.8F|<2%.

In an embodiment, there is at least one aspheric surface from an object-side surface of the first lens to an image-side surface of the seventh lens.

In an embodiment, an effective focal length f1 of the first lens and the total effective focal length f of the camera lens assembly may satisfy: $-3<f1/f<0$.

In an embodiment, the total effective focal length f of the camera lens assembly, a radius of curvature R3 of an object-side surface of the second lens, and a radius of curvature R4 of an image-side surface of the second lens may satisfy: $0<f/R3+f/R4<2$.

In an embodiment, a sum of spaced intervals ΣAT between any two adjacent lenses from the first lens to the seventh lens on the optical axis and a spaced interval T34 between the third lens and the fourth lens on the optical axis may satisfy: $10<\Sigma AT/T34<15$.

In an embodiment, the total effective focal length f of the camera lens assembly and a radius of curvature R8 of an image-side surface of the fourth lens may satisfy: $-2<f/R8<0$.

In an embodiment, a radius of curvature R7 of an object-side surface of the fourth lens and a radius of curvature R8 of an image-side surface of the fourth lens may satisfy: $1<(R7-R8)/(R7+R8)<4$.

In an embodiment, an effective focal length f5 of the fifth lens and a center thickness CT5 of the fifth lens on the optical axis may satisfy: $-1<CT5/f5<0$.

In an embodiment, the total effective focal length f of the camera lens assembly and a center thickness CT6 of the sixth lens on the optical axis may satisfy: $1<f/CT6<3$.

In an embodiment, the total effective focal length f of the camera lens assembly and a spaced interval T67 between the sixth lens and the seventh lens on the optical axis may satisfy: $0<T67/f<0.05$.

In an embodiment, the camera lens assembly further includes a diaphragm arranged between the third lens and the fourth lens, and an effective radius DTS of the diaphragm and a maximum effective radius DT11 of the object-side surface of the first lens may satisfy: $4<DT11/DTS<6$.

In an embodiment, a distance SD from the diaphragm to an image-side surface of the seventh lens on the optical axis and the distance TTL from the object-side surface of the first lens to the image plane of the camera lens assembly on the optical axis may satisfy: $0.4<SD/TTL<0.6$.

In an embodiment, a half of a maximum field-of-view Semi-FOV of the camera lens assembly may satisfy: $60°<$Semi-FOV$<75°$.

In an embodiment, the total effective focal length f of the camera lens assembly and a half of a maximum field-of-view Semi-FOV of the camera lens assembly may satisfy: 0 mm<f/TAN(Semi-FOV)<2 mm.

In an embodiment, the half of the diagonal length ImgH of the effective pixel area on the image plane of the camera lens assembly and an entrance pupil diameter EPD of the camera lens assembly may satisfy: $3<$ImgH$/$EPD$<5$.

In an embodiment, a sum of spaced intervals ΣAT between any two adjacent lenses from the first lens to the seventh lens on the optical axis and the distance TTL from the object-side surface of the first lens to the image plane of the camera lens assembly on the optical axis may satisfy: $0<\Sigma AT/TTL<0.5$.

Another aspect of the disclosure provides a camera lens assembly, and the camera lens assembly along an optical axis from an object side to an image side sequentially includes: a first lens having negative refractive power; a second lens having refractive power; a third lens having refractive power; a diaphragm; a fourth lens having positive refractive power; a fifth lens having negative refractive power; a sixth lens having positive refractive power; and a seventh lens having negative refractive power. An effective radius DTS of the diaphragm and a maximum effective radius DT11 of an object-side surface of the first lens may satisfy: $4<DT11/DTS<6$; and a distortion DIST0.8F of the camera lens assembly at an 0.8 field-of-view may satisfy: |DIST0.8F|<2%.

In an embodiment, an effective focal length f1 of the first lens and a total effective focal length f of the camera lens assembly may satisfy: $-3<f1/f<0$.

In an embodiment, a total effective focal length f of the camera lens assembly, a radius of curvature R3 of an object-side surface of the second lens, and a radius of curvature R4 of an image-side surface of the second lens may satisfy: 0<f/R+f/R4<2.

In an embodiment, a sum of spaced intervals ΣAT between any two adjacent lenses from the first lens to the seventh lens on the optical axis and a spaced interval T34 between the third lens and the fourth lens on the optical axis may satisfy: 10<ΣAT/T34<15.

In an embodiment, a total effective focal length f of the camera lens assembly and a radius of curvature R8 of an image-side surface of the fourth lens may satisfy: −2<f/R8<0.

In an embodiment, a radius of curvature R7 of an object-side surface of the fourth lens and a radius of curvature R8 of an image-side surface of the fourth lens may satisfy: 1<(R7−R8)/(R7+R8)<4.

In an embodiment, an effective focal length f5 of the fifth lens and a center thickness CT5 of the fifth lens on the optical axis may satisfy: −1<CT5/f5<0.

In an embodiment, a total effective focal length f of the camera lens assembly and a center thickness CT6 of the sixth lens on the optical axis may satisfy: 1<f/CT6<3.

In an embodiment, a total effective focal length f of the camera lens assembly and a spaced interval T67 between the sixth lens and the seventh lens on the optical axis may satisfy: 0<T67/f<0.05.

In an embodiment, a distance SD from the diaphragm to an image-side surface of the seventh lens on the optical axis and a distance TTL from the object-side surface of the first lens to an image plane of the camera lens assembly on the optical axis may satisfy: 0.4<SD/TTL<0.6.

In an embodiment, a half of a maximum field-of-view Semi-FOV of the camera lens assembly may satisfy: 60°<Semi-FOV<75°.

In an embodiment, the total effective focal length f of the camera lens assembly and a half of a maximum field-of-view Semi-FOV of the camera lens assembly may satisfy: 0 mm<f/TAN(Semi-FOV)<2 mm.

In an embodiment, a half of a diagonal length ImgH of an effective pixel area on an image plane of the camera lens assembly and an entrance pupil diameter EPD of the camera lens assembly may satisfy: 3<ImgH/EPD<5.

In an embodiment, a sum of spaced intervals ΣAT between any two adjacent lenses from the first lens to the seventh lens on the optical axis and a distance TTL from the object-side surface of the first lens to an image plane of the camera lens assembly on the optical axis may satisfy: 0<Σ/AT/TTL<0.5.

In an embodiment, a distance TTL from the object-side surface of the first lens to an image plane of the camera lens assembly on the optical axis, a half of a diagonal length ImgH of an effective pixel area of the camera lens assembly and the total effective focal length f of the camera lens assembly may satisfy: 15 mm<TTL×ImgH/f<18 mm.

The present disclosure provides a camera lens assembly suitable for portable electronic products, having ultra-wide angle, small distortion, miniaturization and good imaging quality through a reasonable distribution of the refractive power and optimization of optical parameters.

BRIEF DESCRIPTION OF THE DRAWINGS

By reading detailed description of non-limiting embodiments with reference to the following accompanying drawings, other features, objectives and advantages of the present disclosure will be more apparent.

FIG. 1 is a schematic structural diagram illustrating a camera lens assembly according to Example 1 of the present disclosure;

FIGS. 2A-2C respectively illustrate a longitudinal aberration curve, an astigmatic curve and a distortion curve of the camera lens assembly according to Example 1;

FIG. 13 is a schematic structural diagram illustrating a camera lens assembly according to Example 7 of the present disclosure;

FIGS. 14A-14C respectively illustrate a longitudinal aberration curve, an astigmatic curve and a distortion curve of the camera lens assembly according to Example 7;

DETAILED DESCRIPTION OF EMBODIMENTS

Figure 2C:
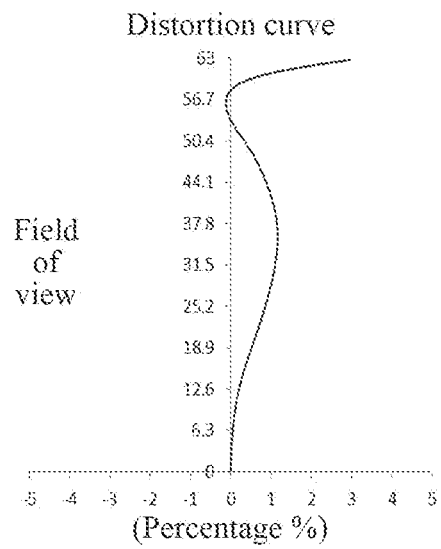

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In this text, the paraxial area refers to an area near the optical axis. If the surface of a lens is a convex surface and the position of the convex surface is not defined, it indicates that the surface of the lens is a convex surface at least in the paraxial area; and if the surface of a lens is a concave surface and the position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having", "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

The features, principles, and other aspects of the present disclosure are described in detail below.

The camera lens assembly according to exemplary implementations of the present disclosure may include seven lenses having refractive power, which are a first lens, a second lens, a third lens, a fourth lens, a fifth lens, a sixth lens and a seventh lens, respectively. The seven lenses are sequentially arranged from the object side to the image side along the optical axis. There may be a spaced interval in any two adjacent lenses from the first lens to the seventh lens.

In an exemplary implementation, the first lens may have negative refractive power; the second lens may have positive refractive power or negative refractive power; the third lens may have positive refractive power or negative refractive power; the fourth lens may have positive refractive power; the fifth lens may have negative refractive power; the sixth lens may have positive refractive power; and the seventh lens may have negative refractive power. By setting the refractive power of the first lens reasonably, it is helpful to ensure that the first lens has a divergent effect on incident light; at the same time, the refractive power of the fourth lens to the seventh lens is reasonably allocated, which is beneficial to improve the imaging quality of the camera lens assembly, and thereby enables a clear and complete image on a photosensitive element.

In an exemplary implementation, the camera lens assembly according to the present disclosure further includes a diaphragm arranged between the third lens and the fourth lens. Alternatively, the camera lens assembly may further include an optical filter used to correct color deviation and/or a protective glass used to protect the photosensitive element on an image plane.

In an exemplary implementation, the camera lens assembly according to the present disclosure may satisfy: 15 mm<TTL×ImgH/f<18 mm, where TTL is a distance from an object-side surface of the first lens to an image plane of the camera lens assembly on the optical axis, ImgH is half of a diagonal length of an effective pixel area of the camera lens assembly, and f is a total effective focal length of the camera lens assembly. Satisfying 15 mm<TTL×ImgH/f<18 mm is not only beneficial to shorten a total length of the camera lens assembly, but also helps to ensure that the camera lens assembly has a clear image in a large field-of-view range, and also helps to increase the brightness of the image plane.

In an exemplary implementation, the camera lens assembly according to the present disclosure may satisfy: |DIST0.8F|<2%, where DIST0.8F is a distortion of the camera lens assembly at an 0.8 field-of-view. More specifically, DIST0.8F may further satisfy: |DIST0.8F|<1.1%. Satisfying |DIST0.8F|<2%, may make the camera lens assembly have a better shooting effect under the premise of ensuring that the camera lens assembly has a wide field-of-view and high imaging quality.

In an exemplary implementation, the camera lens assembly according to the present disclosure may satisfy: −3<f1/f<0, where f1 is an effective focal length of the first lens, and f is the total effective focal length of the camera lens assembly. More specifically, f1 and f may further satisfy: −2.2<f1/f<−1.4. Satisfying −3<f1/f<0 may effectively avoid the focus of the first lens being too concentrated, causing the problem of high sensitivity of the lens, and making tolerance requirements of the first lens more in line with the existing process capability level. The first lens set in this way combined with the second lens may effectively balance a spherical aberration, coma and astigmatism of the lens assembly. At the same time, it may ensure the first lens has sufficient refractive power to diverge the light, so as to improve the imaging quality, and thereby enables a clear and complete image on the photosensitive element.

In an exemplary implementation, the camera lens assembly according to the present disclosure may satisfy: 0<f/R3+f/R4<2, where f is the total effective focal length of the camera lens assembly, R3 is a radius of curvature of an object-side surface of the second lens, and R4 is a radius of curvature of an image-side surface of the second lens. More specifically, f, R3 and R4 may further satisfy: 0.8<f/R3+f/R4<1.6. Satisfying 0<f/R3+f/R4<2 may effectively reduce the size of a front end of the lens assembly, which is conducive to miniaturization of the lens assembly, and may also reduce a secondary reflection ghost image generated between the second lens and the third lens, avoiding the influence of ghost images on the actual imaging quality.

In an exemplary implementation, the camera lens assembly according to the present disclosure may satisfy: $10 < \Sigma AT/T34 < 15$, where $\Sigma AT$ is a sum of spaced intervals between any two adjacent lenses from the first lens to the seventh lens on the optical axis, and T34 is a spaced interval between the third lens and the fourth lens on the optical axis. More specifically, $\Sigma AT$ and T34 may further satisfy: $12.5 < \Sigma AT/T34 < 14$. Satisfying $10 < \Sigma AT/T34 < 15$ may ensure the processing and assembly characteristics of the lens assembly, and may avoid problems such as small gaps between the lenses leading to interference between the front and rear lenses in the assembly process, too thin lenses, and great difficulty in molding or easy to deform when assembled. At the same time, setting the spaced intervals between the lenses reasonably may better balance the distortion of the lens assembly, reduce ghost energy, and improve the imaging quality of the lens assembly.

In an exemplary implementation, the camera lens assembly according to the present disclosure may satisfy: $-2 < f/R8 < 0$, where f is the total effective focal length of the camera lens assembly, and R8 is a radius of curvature of an image-side surface of the fourth lens. More specifically, f and R8 may further satisfy: $-1.4 < f/R8 < -0.6$. Satisfying $-2 < f/R8 < 0$ is conducive to reasonably setting the total effective focal length of the camera lens assembly, so that the camera lens assembly may maintain an ultra-wide angle while also having a high aberration correction ability, and it may also make the camera lens assembly have better manufacturability.

In an exemplary implementation, the camera lens assembly according to the present disclosure may satisfy: $1 < (R7-R8)/(R7+R8) < 4$, where R7 is a radius of curvature of an object-side surface of the fourth lens, and R8 is a radius of curvature of an image-side surface of the fourth lens. More specifically, R7 and R8 may further satisfy: $1.9 < (R7-R8)/(R7+R8) < 3.3$. Satisfying $1 < (R7-R8)/(R7+R8) < 4$ may effectively balance an astigmatism and coma between the fourth lens and the front lens, so that the lens assembly has better imaging quality, and may also reduce sensitivity of the lens assembly, effectively avoid a series of processing problems caused by poor manufacturability of the fourth lens.

In an exemplary implementation, the camera lens assembly according to the present disclosure may satisfy: $-1 < CT5/f5 < 0$, where f5 is an effective focal length of the fifth lens, and CT5 is a center thickness of the fifth lens on the optical axis. More specifically, CT5 and f5 may further satisfy: $-0.08 < CT5/f5 < -0.03$. Satisfying $-1 < CT5/f5 < 0$ may better balance the overall distortion and field curvature of the camera lens assembly, and may also distribute the refractive power of the fifth lens reasonably, while ensuring that the camera lens assembly has ultra-wide angle and small distortion, it may also have a high aberration correction ability, and may also make the fifth lens have better manufacturability.

In an exemplary implementation, the camera lens assembly according to the present disclosure may satisfy: $1 < f/CT6 < 3$, where f is the total effective focal length of the camera lens assembly, and CT6 is a center thickness of the sixth lens on the optical axis. More specifically, f and CT6 may further satisfy: $1.6 < f/CT6 < 2.4$. Satisfying $1 < f/CT6 < 3$, the refractive power of the camera lens assembly may be reasonably distributed, so that the camera lens assembly maintains an ultra-wide angle while helping to control the distortion contribution of each field-of-view of the lens assembly within a reasonable range, so that the total distortion of the lens assembly is within a certain range, which is conducive to better miniaturization of the lens assembly, which in turn facilitates the assembly of the lens assembly.

In an exemplary implementation, the camera lens assembly according to the present disclosure may satisfy: $0 < T67/f < 0.05$, where f is the total effective focal length of the camera lens assembly, and T67 is a spaced interval between the sixth lens and the seventh lens on the optical axis. Satisfying $0 < T67/f < 0.05$ may effectively reduce the contribution of the field curvature of the lens assembly, so that an off-axis field-of-view of the lens assembly may obtain good imaging quality, and at the same time the total length of the lens assembly may be effectively reduced.

In an exemplary implementation, the camera lens assembly according to the present disclosure may satisfy: $4 < DT11/DTS < 6$, where DTS is an effective radius of the diaphragm, and DT11 is a maximum effective radius of an object-side surface of the first lens. More specifically, DT11 and DTS may further satisfy: $4.4 < DT11/DTS < 5.2$. Satisfying $4 < DT11/DTS < 6$ may effectively control a vignetting value of the lens assembly, intercept the part of light with poor imaging quality, thereby improve an overall resolution of the lens assembly, and may also avoid problems such as a difference in the maximum effective radius of the object-side surface of the first lens is too large to generate a large step difference, and may also ensure the stability of the assembly of the first lens.

In an exemplary implementation, the camera lens assembly according to the present disclosure may satisfy: $0.4 < SD/TTL < 0.6$, where SD is a distance from the diaphragm to an image-side surface of the seventh lens on the optical axis, and TTL is the distance from the object-side surface of the first lens to the image plane of the camera lens assembly on the optical axis. Satisfying $0.4 < SD/TTL < 0.6$ may improve a relative contrast of the lens assembly, may effectively correct the coma, astigmatism, distortion and a longitudinal aberration related to the diaphragm, which is conducive to improving the imaging quality and realizing the miniaturization of the lens assembly.

In an exemplary implementation, the camera lens assembly according to the present disclosure may satisfy: $60° < \text{Semi-FOV} < 75°$, where Semi-FOV is half of a maximum field-of-view of the camera lens assembly. More specifically, Semi-FOV may further satisfy: $60° < \text{Semi-FOV} < 68°$. Satisfying $60° < \text{Semi-FOV} < 75°$ is beneficial for the camera lens assembly to obtain a larger field-of-view range of the object in an actual shooting process, that is, it may add foreground to landscape photos or add more background space to portrait photos in the shooting process, making consumers feel better.

In an exemplary implementation, the camera lens assembly according to the present disclosure may satisfy: $0 \text{ mm} < f/\text{TAN(Semi-FOV)} < 2 \text{ mm}$, where f is the total effective focal length of the camera lens assembly, and Semi-FOV is half of a maximum field-of-view of the camera lens assembly. More specifically, f and Semi-FOV may further satisfy: $0.6 \text{ mm} < f/\text{TAN(Semi-FOV)} < 1.3 \text{ mm}$. Satisfying $0 \text{ mm} < f/\text{TAN(Semi-FOV)} < 2 \text{ mm}$ is beneficial to better balance an overall aberration of the lens assembly, so that the lens assembly may obtain a large field-of-view while ensuring that the photosensitive element may present a clear and complete image, which is beneficial to achieve a better shooting effect.

In an exemplary implementation, the camera lens assembly according to the present disclosure may satisfy: 3<ImgH/EPD<5, where ImgH is half of the diagonal length of the effective pixel area on the image plane of the camera lens assembly, and EPD is an entrance pupil diameter of the camera lens assembly. More specifically, ImgH and EPD may further satisfy: 4<ImgH/EPD<4.6. Satisfying 3<ImgH/EPD<5, not only may make the lens assembly have a large image plane, but also may ensure that the lens assembly has sufficient luminous flux, on the basis of a small front port diameter, which is beneficial to avoid problems such as the entrance pupil diameter of the camera lens assembly is too small, resulting in weak light energy acquired, or an MTF diffraction limit of the lens assembly is too low, resulting in poor imaging quality.

In an exemplary implementation, the camera lens assembly according to the present disclosure may satisfy: 0<ΣT/TTL<0.5, where ΣAT is a sum of spaced intervals between any two adjacent lenses from the first lens to the seventh lens on the optical axis, and TTL is the distance from the object-side surface of the first lens to the image plane of the camera lens assembly on the optical axis. More specifically, ΣAT and TTL may further satisfy: 0.1<ΣAT/TTL<0.4. Satisfying 0<ΣAT/TTL<0.5 may make the structure of each lens more compact, so that the camera lens assembly may achieve ultra-wide angle while keeping the total length still within a reasonable range.

The present disclosure proposes a camera lens assembly having characteristics such as miniaturization, ultra-wide angle, small distortion, and high imaging quality. The camera lens assembly according to the above implementations of the present disclosure may employ a plurality of lenses, such as seven lenses as described above. By reasonably distributing the refractive power of each lens, the surface shape, the center thickness of each lens and the spaced intervals along the optical axis between the lenses, it may effectively converge incident light, reduce the total track length of the imaging lens assembly and improve the processability of the imaging lens assembly, making the camera lens assembly more conducive to production and processing.

In the implementations of the present disclosure, at least one of the surfaces of the lenses is an aspheric surface, that is, at least one of the surfaces from the object-side surface of the first lens to an image-side surface of the seventh lens is an aspheric surface. The characteristic of the aspheric lens is: the curvature is continuously changing from the center of the lens to the periphery of the lens. Unlike the spherical lens with a constant curvature from the center of the lens to the periphery, the aspheric lens has a better radius of curvature characteristic, having advantages of improving the distortion aberration and improving the astigmatic aberration. The use of the aspheric lens can eliminate as much as possible the aberrations that occur during the imaging, thereby improving the imaging quality. Alternatively, at least one of the object-side surface or the image-side surface of each of the first lens, the second lens, the third lens, the fourth lens, the fifth lens, the sixth lens and the seventh lens is an aspheric surface. Alternatively, the object-side surface and the image-side surface of each of the first lens, the second lens, the third lens, the fourth lens, the fifth lens, the sixth lens and the seventh lens are aspheric surfaces.

However, it should be understood by those skilled in the art that the various results and advantages described in the present specification may be obtained by changing the number of the lenses constituting the camera lens assembly without departing from the technical solution claimed by the present disclosure. For example, although the camera lens assembly having seven lenses is described as an example in the implementations, the camera lens assembly is not limited to include seven lenses. If desired, the camera lens assembly may also include other numbers of lenses.

Specific examples of the camera lens assembly that may be applied to the above implementations are further described below with reference to the accompanying drawings.

Example 1

A camera lens assembly according to Example 1 of the present disclosure is described below with reference to FIGS. 1-2C. FIG. 1 is a schematic structural diagram illustrating the camera lens assembly according to Example 1 of the present disclosure.

As shown in FIG. 1, the camera lens assembly from an object side to an image side sequentially includes: a first lens E1, a second lens E2, a third lens E3, a diaphragm STO, a fourth lens E4, a fifth lens E5, a sixth lens E6, a seventh lens E7, an optical filter E8 and an image plane S17.

The first lens E1 has negative refractive power, an object-side surface S1 of the first lens is a convex surface, and an image-side surface S2 of the first lens is a concave surface. The second lens E2 has positive refractive power, an object-side surface S3 of the second lens is a convex surface, and an image-side surface S4 of the second lens is a concave surface. The third lens E3 has positive refractive power, an object-side surface S5 of the third lens is a convex surface, and an image-side surface S6 of the third lens is a convex surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a convex surface, and an image-side surface S10 of the fifth lens is a concave surface. The sixth lens E6 has positive refractive power, an object-side surface S11 of the sixth lens is a concave surface, and an image-side surface S12 of the sixth lens is a convex surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. Light from an object sequentially passes through the surfaces S1 to S16 and is finally imaged on the image plane S17.

Table 1 is a table illustrating basic parameters of the camera lens assembly of Example 1, where the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | infinite | | | | |
| S1 | Aspheric | 70.2234 | 0.6290 | 1.54 | 56.00 | −3.47 | −0.0643 |
| S2 | Aspheric | 1.8481 | 0.8163 | | | | −0.0044 |
| S3 | Aspheric | 3.1023 | 0.6460 | 1.67 | 19.20 | 17.03 | 2.0775 |
| S4 | Aspheric | 3.8592 | 0.4340 | | | | 10.6119 |
| S5 | Aspheric | 6.6464 | 0.3225 | 1.54 | 56.00 | 11.25 | −16.3776 |
| S6 | Aspheric | −86.4862 | 0.1510 | | | | −99.0000 |
| STO | Spherical | infinite | 0.0300 | | | | |
| S7 | Aspheric | 4.2692 | 0.8444 | 1.54 | 56.00 | 2.05 | 0.4581 |
| S8 | Aspheric | −1.4184 | 0.0381 | | | | −17.4286 |
| S9 | Aspheric | 6.2690 | 0.2482 | 1.67 | 19.20 | −5.64 | −46.5286 |
| S10 | Aspheric | 2.3605 | 0.7981 | | | | −9.4492 |
| S11 | Aspheric | −4.1815 | 0.7656 | 1.54 | 56.00 | 1.80 | −1.3787 |
| S12 | Aspheric | −0.8520 | 0.0334 | | | | −4.4406 |
| S13 | Aspheric | 2.7437 | 0.5101 | 1.64 | 23.50 | −1.92 | −0.2452 |
| S14 | Aspheric | 0.7965 | 0.6540 | | | | −5.3087 |
| S15 | Spherical | infinite | 0.2100 | 1.52 | 54.50 | | |
| S16 | Spherical | infinite | 0.0830 | | | | |
| S17 | Spherical | infinite | | | | | |

In this example, the total effective focal length f of the camera lens assembly is 1.79 mm, and the maximum field-of-view FOV of the camera lens assembly is 129.5.

In Example 1, the object-side surface and the image-side surface of any one of the first lens E1 to the seventh lens E7 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; and Ai is a correction coefficient for the i-th order of the aspheric surface. Tables 2-1 and 2-2 below show high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$, and $A_{30}$ applicable to each aspheric surface S1 to S14 in Example 1.

TABLE 2-1

| Surface number | A4 | A6 | A8 | A10 | A12 | A14 | A16 |
|---|---|---|---|---|---|---|---|
| S1 | 3.1844E−02 | −2.0807E−02 | 1.1828E−02 | −4.9382E−03 | 1.4941E−03 | −3.2432E−04 | 4.9669E−05 |
| S2 | 5.4251E−02 | −1.2354E−01 | 3.1240E−01 | −5.7133E−01 | 6.1796E−01 | −1.9399E−01 | −4.4647E−01 |
| S3 | 7.5163E−02 | −1.9135E−01 | 9.3631E−01 | −2.7948E+00 | 5.5730E+00 | −7.5735E+00 | 6.9714E+00 |
| S4 | 2.2308E−01 | −2.1378E+00 | 2.7829E+01 | −2.2695E+02 | 1.2494E+03 | −4.8330E+03 | 1.3452E+04 |
| S5 | −3.2290E−02 | 6.6994E−01 | −1.5150E+01 | 1.7862E+02 | −1.3801E+03 | 7.3370E+03 | −2.7664E+04 |
| S6 | −7.8652E−03 | −7.5001E−01 | 1.1492E+01 | −1.4695E+02 | 1.3770E+03 | −9.4815E+03 | 4.7871E+04 |
| S7 | 4.1912E−02 | 5.5591E−01 | −1.7281E+01 | 3.0570E+02 | −3.5571E+03 | 2.8505E+04 | −1.6178E+05 |
| S8 | −4.5008E−01 | 4.2088E−01 | 1.1650E+01 | −1.7156E+02 | 1.3546E+03 | −6.9660E+03 | 2.4710E+04 |
| S9 | 1.7565E−02 | −1.3608E+00 | 9.7053E+00 | −5.9796E+01 | 2.9638E+02 | −1.1278E+03 | 3.2377E+03 |
| S10 | −1.0962E−01 | 6.7463E−02 | 2.3324E−01 | −2.0985E+00 | 8.3817E+00 | −2.1041E+01 | 3.5779E+01 |
| S11 | 4.8320E−02 | −4.1418E−02 | 9.5848E−02 | −3.1022E−01 | 6.6952E−01 | −9.5244E−01 | 9.3709E−01 |
| S12 | −1.1493E−01 | 1.7110E−01 | −2.4453E−01 | 3.5365E−01 | −4.5823E−01 | 4.8166E−01 | −3.7991E−01 |
| S13 | −1.3334E−01 | 2.4466E−02 | 5.2709E−03 | −8.5486E−03 | 6.1486E−03 | −3.1400E−03 | 1.1475E−03 |
| S14 | −3.5389E−02 | −1.3207E−02 | 2.8260E−02 | −2.2916E−02 | 1.1827E−02 | −4.2174E−03 | 1.0685E−03 |

TABLE 2-2

| Surface number | A18 | A20 | A22 | A24 | A26 | A28 | A30 |
|---|---|---|---|---|---|---|---|
| S1 | −5.1483E−06 | 3.1966E−07 | −5.6573E−09 | −8.3063E−10 | 7.6349E−11 | −2.7956E−12 | 4.0267E−14 |
| S2 | 7.6912E−01 | −6.2823E−01 | 3.1756E−01 | −1.0401E−01 | 2.1585E−02 | −2.5885E−03 | 1.3693E−04 |
| S3 | −4.1099E+00 | 1.2187E+00 | 1.6909E−01 | −3.2505E−01 | 1.3718E−01 | −2.7652E−02 | 2.2791E−03 |
| S4 | −2.7249E+04 | 4.0200E+04 | −4.2715E+04 | 3.1826E+04 | −1.5773E+04 | 4.6680E+03 | −6.2406E+02 |
| S5 | 7.5162E+04 | −1.4768E+05 | 2.0793E+05 | −2.0454E+05 | 1.3346E+05 | −5.1886E+04 | 9.0964E+03 |
| S6 | −1.7660E+05 | 4.7279E+05 | −9.0527E+05 | 1.2054E+06 | −1.0586E+06 | 5.5056E+05 | −1.2835E+05 |
| S7 | 6.6013E+05 | −1.9436E+06 | 4.0934E+06 | −6.0153E+06 | 5.8584E+06 | −3.3980E+06 | 8.8827E+05 |

TABLE 2-2-continued

| Surface number | A18 | A20 | A22 | A24 | A26 | A28 | A30 |
|---|---|---|---|---|---|---|---|
| S8 | −6.2042E+04 | 1.1123E+05 | −1.4152E+05 | 1.2483E+05 | −7.2590E+04 | 2.5026E+04 | −3.8746E+03 |
| S9 | −6.9728E+03 | 1.1173E+04 | −1.3093E+04 | 1.0867E+04 | −6.0339E+03 | 2.0055E+03 | −3.0104E+02 |
| S10 | −4.2504E+01 | 3.5645E+01 | −2.0979E+01 | 8.4591E+00 | −2.2189E+00 | 3.3982E−01 | −2.2957E−02 |
| S11 | −6.5739E−01 | 3.3269E−01 | −1.2080E−01 | 3.0705E−02 | −5.1851E−03 | 5.2206E−04 | −2.3693E−05 |
| S12 | 2.1662E−01 | −8.7872E−02 | 2.5011E−02 | −4.8728E−03 | 6.1850E−04 | −4.6074E−05 | 1.5281E−06 |
| S13 | −2.9842E−04 | 5.5089E−05 | −7.1583E−06 | 6.4001E−07 | −3.7491E−08 | 1.2961E−09 | −2.0059E−11 |
| S14 | −1.9462E−04 | 2.5523E−05 | −2.3855E−06 | 1.5489E−07 | −6.6345E−09 | 1.6849E−10 | −1.9209E−12 |

FIG. 2A illustrates the longitudinal aberration curve of the camera lens assembly according to Example 1, representing deviations of focal points converged by light of different wavelengths after passing through the lens assembly. FIG. 2B illustrates the astigmatic curve of the camera lens assembly according to Example 1, representing a curvature of a tangential plane and a curvature of a sagittal plane. FIG. 2C illustrates the distortion curve of the camera lens assembly according to Example 1, representing the amounts of distortion corresponding to different field-of-views. It can be seen from FIG. 2A to FIG. 2C that the camera lens assembly provided in Example 1 can achieve good imaging quality.

Example 2

Figure 3:
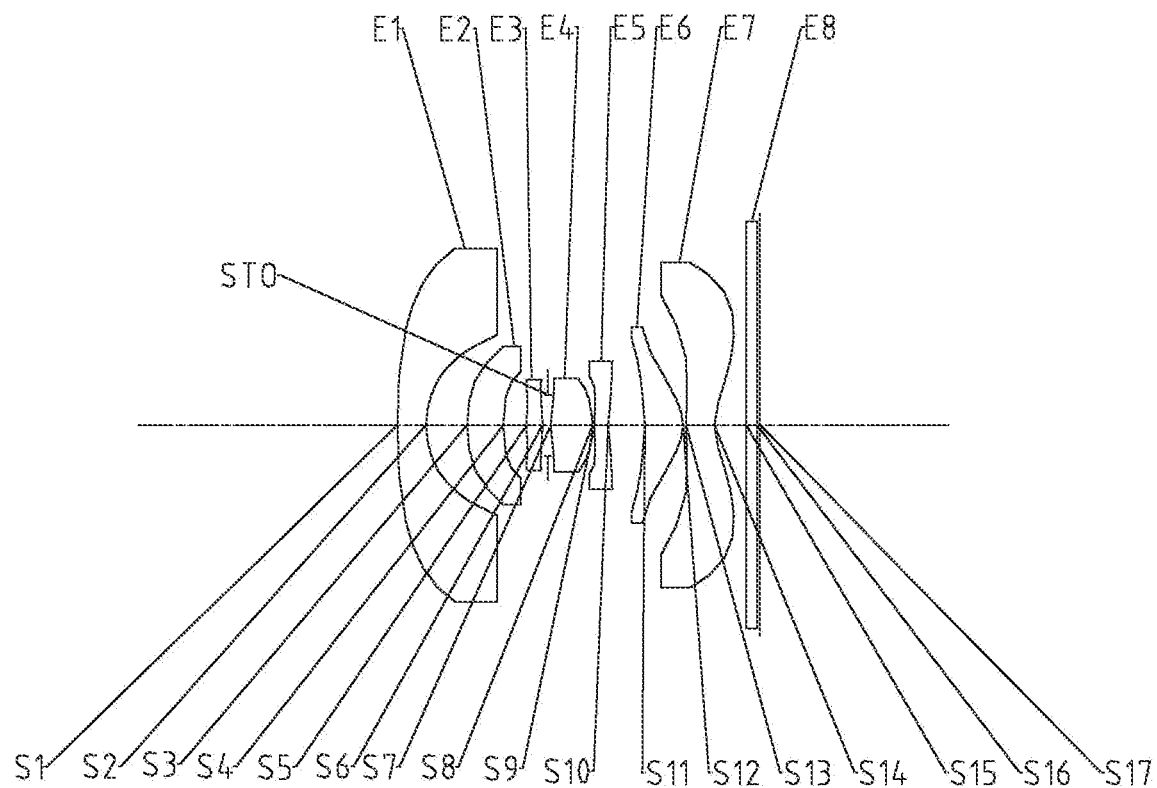
FIG. 3 is a schematic structural diagram illustrating a camera lens assembly according to Example 2 of the present disclosure.

A camera lens assembly according to Example 2 of the present disclosure is described below with reference to FIG. 3 to FIG. 4C. In this example and the following examples, for the purpose of brevity, the description of parts similar to those in Example 1 will be omitted. FIG. 3 illustrates a schematic structural diagram of the camera lens assembly according to Example 2 of the present disclosure.

As shown in FIG. 3, the camera lens assembly from an object side to an image side sequentially includes: a first lens E1, a second lens E2, a third lens E3, a diaphragm STO, a fourth lens E4, a fifth lens E5, a sixth lens E6, a seventh lens E7, an optical filter E8 and an image plane S17.

The first lens E1 has negative refractive power, an object-side surface S1 of the first lens is a convex surface, and an image-side surface S2 of the first lens is a concave surface. The second lens E2 has positive refractive power, an object-side surface S3 of the second lens is a convex surface, and an image-side surface S4 of the second lens is a concave surface. The third lens E3 has positive refractive power, an object-side surface S5 of the third lens is a convex surface, and an image-side surface S6 of the third lens is a convex surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a convex surface, and an image-side surface S10 of the fifth lens is a concave surface. The sixth lens E6 has positive refractive power, an object-side surface S11 of the sixth lens is a concave surface, and an image-side surface S12 of the sixth lens is a convex surface. The seventh lens E7 has negative refractive power, an object-side surface S13 of the seventh lens is a concave surface, and an image-side surface S14 of the seventh lens is a concave surface. The optical filter E8 has an object-side surface S15 and an image-side surface S16. Light from an object sequentially passes through the surfaces 51 to S16 and is finally imaged on the image plane S17.

In this example, the total effective focal length f of the camera lens assembly is 1.72 mm, and the maximum field-of-view FOV of the camera lens assembly is 130.6.

Table 3 is a table illustrating basic parameters of the camera lens assembly of Example 2, where the units for the radius of curvature, the thickness/distance and the focal length are millimeter (mm). Tables 4-1 and 4-2 show high-order coefficients applicable to each aspheric surface in Example 2, where the surface shape of each aspheric surface may be defined by the formula (1) given in the above Example 1.

TABLE 3

| Surface number | Surface type | Radius of curvature | Thickness/ Distance | Material Refractive index | Material Abbe number | Focal length | Conic coefficient |
|---|---|---|---|---|---|---|---|
| OBJ | Spherical | infinite | infinite | | | | |
| S1 | Aspheric | 34.5045 | 0.5644 | 1.54 | 56.00 | −3.55 | −0.0876 |
| S2 | Aspheric | 1.8355 | 0.8167 | | | | −0.0019 |
| S3 | Aspheric | 3.3257 | 0.7110 | 1.67 | 19.20 | 20.54 | 2.0556 |
| S4 | Aspheric | 3.9683 | 0.4655 | | | | 9.4019 |
| S5 | Aspheric | 6.3342 | 0.3169 | 1.54 | 56.00 | 10.86 | −10.4978 |
| S6 | Aspheric | −100.0001 | 0.1390 | | | | −75.4379 |
| STO | Spherical | infinite | 0.0250 | | | | |
| S7 | Aspheric | 4.1036 | 0.8406 | 1.54 | 56.00 | 2.05 | 1.1255 |
| S8 | Aspheric | −1.4349 | 0.0284 | | | | −18.7927 |
| S9 | Aspheric | 6.4041 | 0.2678 | 1.67 | 19.20 | −5.81 | −49.8997 |
| S10 | Aspheric | 2.4200 | 0.7328 | | | | −9.4992 |
| S11 | Aspheric | −3.9454 | 0.7590 | 1.54 | 56.00 | 1.47 | −0.8640 |
| S12 | Aspheric | −0.7155 | 0.0551 | | | | −4.3183 |
| S13 | Aspheric | −3469.1618 | 0.5637 | 1.64 | 23.50 | −1.56 | 50.0000 |
| S14 | Aspheric | 1.0204 | 0.6340 | | | | −6.9124 |
| S15 | Spherical | infinite | 0.2100 | 1.52 | 54.50 | | |
| S16 | Spherical | infinite | 0.0610 | | | | |
| S17 | Spherical | infinite | | | | | |

TABLE 4-1

| Surface number | A4 | A6 | A8 | A10 | A12 | A14 | A16 |
|---|---|---|---|---|---|---|---|
| S1 | 1.5636E−02 | 1.0381E−02 | −2.3270E−02 | 1.9771E−02 | −1.0117E−02 | 3.4802E−03 | −8.4388E−04 |
| S2 | 1.1401E−01 | −3.6627E−01 | 2.7043E−01 | 2.4219E+00 | −9.7202E+00 | 1.8767E+01 | −2.2705E+01 |
| S3 | 9.6712E−02 | −3.2492E−01 | 1.5724E+00 | −4.8286E+00 | 1.0159E+01 | −1.5038E+01 | 1.5866E+01 |
| S4 | 1.8374E−01 | −1.6267E+00 | 2.3891E+01 | −2.0615E+02 | 1.1694E+03 | −4.5819E+03 | 1.2758E+04 |
| S5 | 1.0099E−01 | −3.1973E+00 | 4.9111E+01 | −5.1255E+02 | 3.6823E+03 | −1.8796E+04 | 6.9480E+04 |
| S6 | 6.3180E−03 | −1.1649E+00 | 1.7240E+01 | −1.8440E+02 | 1.4274E+03 | −8.3888E+03 | 3.7604E+04 |
| S7 | 4.5763E−02 | 6.1558E−01 | −2.0636E+01 | 3.6553E+02 | −4.0787E+03 | 3.0417E+04 | −1.5684E+05 |
| S8 | −3.7663E−01 | −1.7184E+00 | 4.0727E+01 | −4.3082E+02 | 2.9634E+03 | −1.4087E+04 | 4.7542E+04 |
| S9 | 6.2418E−02 | −2.3253E+00 | 1.7903E+01 | −9.6777E+01 | 3.5469E+02 | −8.2858E+02 | 9.9565E+02 |
| S10 | −7.9651E−02 | −3.2997E−01 | 3.5968E+00 | −2.0728E+01 | 7.7937E+01 | −2.0156E+02 | 3.6917E+02 |
| S11 | 3.0203E−02 | −1.0924E−02 | 2.6585E−01 | −1.3018E+00 | 3.0554E+00 | −4.2934E+00 | 3.8927E+00 |
| S12 | −1.0283E−01 | −1.5109E−01 | 1.8638E+00 | −6.2135E+00 | 1.1550E+01 | −1.3751E+01 | 1.1158E+01 |
| S13 | 2.7389E−01 | −6.0391E−01 | 6.4875E−01 | −4.4110E−01 | 2.0214E−01 | −6.4468E−02 | 1.4600E−02 |
| S14 | −1.7121E−02 | 4.4146E−02 | −1.4701E−01 | 1.8772E−01 | −1.3361E−01 | 6.0566E−02 | −1.8617E−02 |

TABLE 4-2

| Surface number | A18 | A20 | A22 | A24 | A26 | A28 | A30 |
|---|---|---|---|---|---|---|---|
| S1 | 1.4743E−04 | −1.8666E−05 | 1.6987E−06 | −1.0836E−07 | 4.6004E−09 | −1.1676E−10 | 1.3407E−12 |
| S2 | 1.8602E+01 | −1.0619E+01 | 4.2375E+00 | −1.1606E+00 | 2.0803E−01 | −2.1987E−02 | 1.0391E−03 |
| S3 | −1.1935E+01 | 6.3052E+00 | −2.2520E+00 | 4.9914E−01 | −5.3828E−02 | −5.4199E−04 | 4.9712E−04 |
| S4 | −2.5617E+04 | 3.7193E+04 | −3.8682E+04 | 2.8093E+04 | −1.3528E+04 | 3.8814E+03 | −5.0225E+02 |
| S5 | −1.8766E+05 | 3.6996E+05 | −5.2582E+05 | 5.2404E+05 | −3.4711E+05 | 1.3711E+05 | −2.4423E+04 |
| S6 | −1.2678E+05 | 3.1560E+05 | −5.6747E+05 | 7.1397E+05 | −5.9523E+05 | 2.9518E+05 | −6.5896E+04 |
| S7 | 5.6914E+05 | −1.4598E+06 | 2.6224E+06 | −3.2132E+06 | 2.5437E+06 | −1.1639E+06 | 2.3131E+05 |
| S8 | −1.1549E+05 | 2.0243E+05 | −2.5358E+05 | 2.2126E+05 | −1.2766E+05 | 4.3763E+04 | −6.7457E+03 |
| S9 | 3.6883E+02 | −3.7451E+03 | 7.0765E+03 | −7.3656E+03 | 4.5844E+03 | −1.6032E+03 | 2.4333E+02 |
| S10 | −4.8650E+02 | 4.6305E+02 | −3.1551E+02 | 1.5005E+02 | −4.7297E+01 | 8.8767E+00 | −7.5070E−01 |
| S11 | −2.3262E+00 | 8.9713E−01 | −2.0201E−01 | 1.5686E−02 | 3.8887E−03 | −1.0883E−03 | 8.2449E−05 |
| S12 | −6.3666E+00 | 2.5862E+00 | −7.4518E−01 | 1.4901E−01 | −1.9682E−02 | 1.5453E−03 | −5.4642E−05 |
| S13 | −2.3738E−03 | 2.7755E−04 | −2.3115E−05 | 1.3371E−06 | −5.1036E−08 | 1.1555E−09 | −1.1750E−11 |
| S14 | 4.0037E−03 | −6.0969E−04 | 6.5488E−05 | −4.8534E−06 | 2.3621E−07 | −6.7939E−09 | 8.7513E−11 |

Figure 4A:
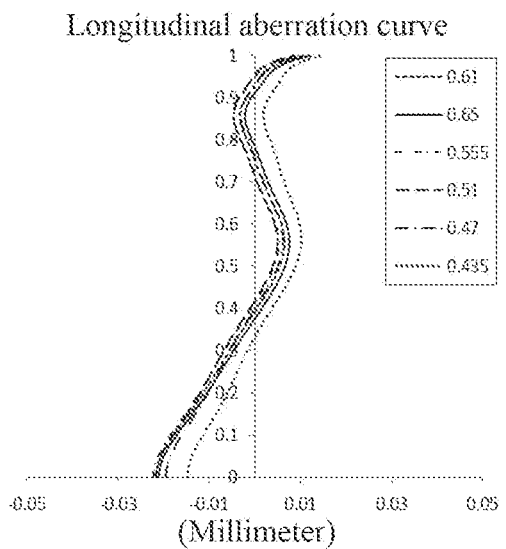
FIGS. 4A-4C respectively illustrate a longitudinal aberration curve, an astigmatic curve and a distortion curve of the camera lens assembly according to Example 2.
Figure 4B:
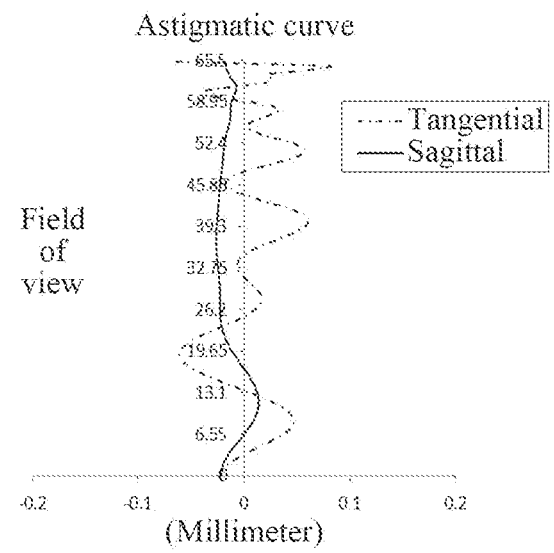
Figure 4C:
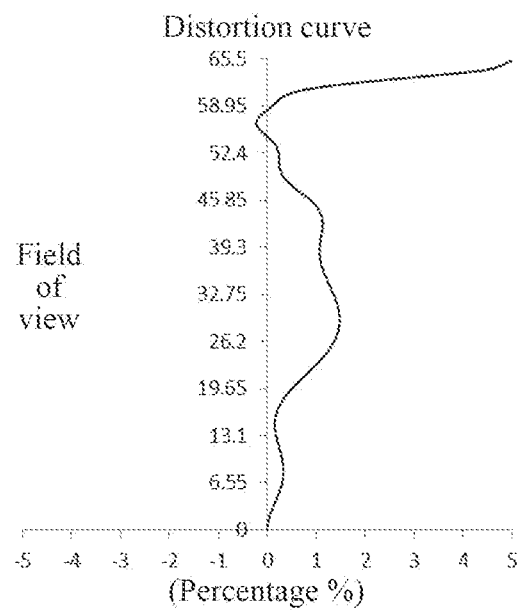

FIG. 4A illustrates the longitudinal aberration curve of the camera lens assembly according to Example 2, representing deviations of focal points converged by light of different wavelengths after passing through the lens assembly. FIG. 4B illustrates the astigmatic curve of the camera lens assembly according to Example 2, representing a curvature of a tangential plane and a curvature of a sagittal plane. FIG. 4C illustrates the distortion curve of the camera lens assembly according to Example 2, representing the amounts of distortion corresponding to different field-of-views. It can be seen from FIG. 4A to FIG. 4C that the camera lens assembly provided in Example 2 can achieve good imaging quality.

Example 3

Figure 5:
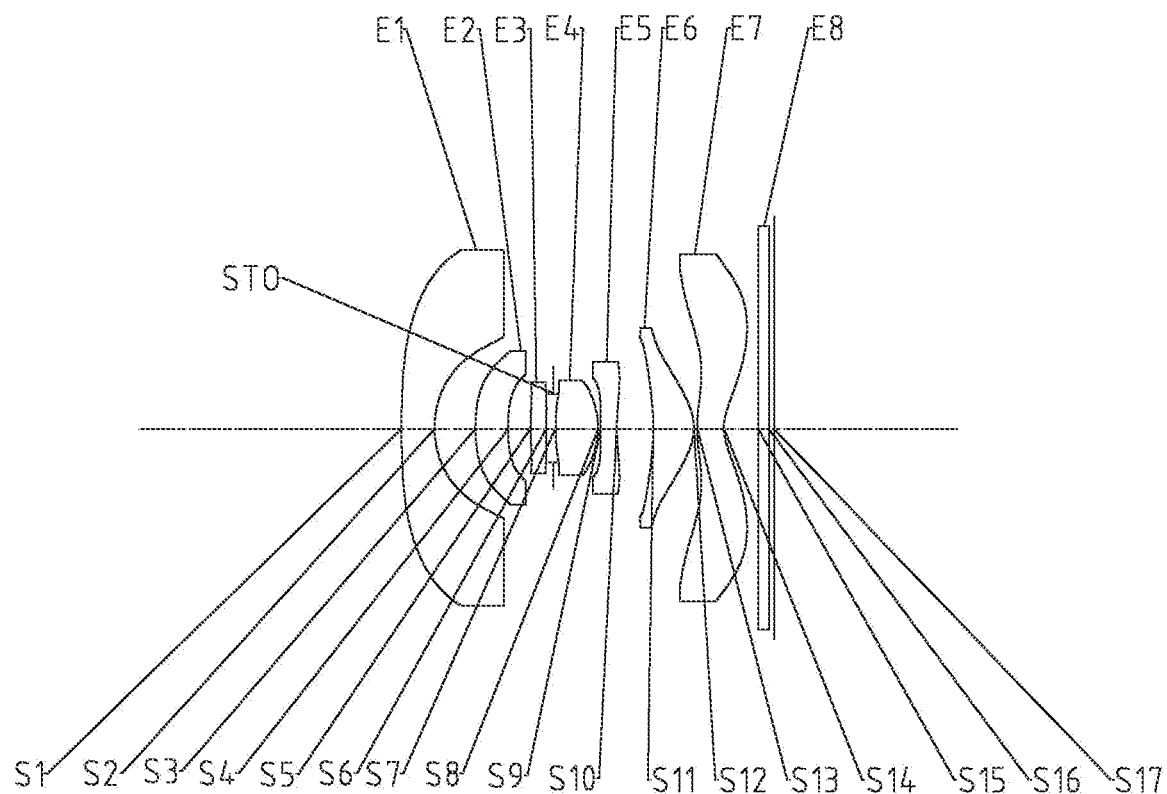
FIG. 5 is a schematic structural diagram illustrating a camera lens assembly according to Example 3 of the present disclosure.

A camera lens assembly according to Example 3 of the present disclosure is described below with reference to FIG. 5 to FIG. 6C. FIG. 5 illustrates a schematic structural diagram of the camera lens assembly according to Example 3 of the present disclosure.

As shown in FIG. 5, the camera lens assembly from an object side to an image side sequentially includes: a first lens E1, a second lens E2, a third lens E3, a diaphragm STO, a fourth lens E4, a fifth lens E5, a sixth lens E6, a seventh lens E7, an optical filter E8 and an image plane S17.

The first lens E1 has negative refractive power, an object-side surface S1 of the first lens is a convex surface, and an image-side surface S2 of the first lens is a concave surface. The second lens E2 has positive refractive power, an object-side surface S3 of the second lens is a convex surface, and an image-side surface S4 of the second lens is a concave surface. The third lens E3 has positive refractive power, an object-side surface S5 of the third lens is a convex surface, and an image-side surface S6 of the third lens is a concave surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a concave surface. The sixth lens E6 has positive refractive power, an object-side surface S11 of the sixth lens is a concave surface, and an image-side surface S12 of the sixth lens is a convex surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. Light from an object sequentially passes through the surfaces S1 to S16 and is finally imaged on the image plane S17.

In this example, the total effective focal length f of the camera lens assembly is 1.79 mm, and the maximum field-of-view FOV of the camera lens assembly is 128.6.

Table 5 is a table illustrating basic parameters of the camera lens assembly of Example 3, where the units for the radius of curvature, the thickness/distance and the focal length are millimeter (mm). Tables 6-1 and 6-2 show high-order coefficients applicable to each aspheric surface in Example 3, where the surface shape of each aspheric surface may be defined by the formula (1) given in the above Example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | infinite | | | | |
| S1 | Aspheric | 50.8039 | 0.6475 | 1.54 | 56.00 | −3.43 | −0.0461 |
| S2 | Aspheric | 1.8085 | 0.8037 | | | | −0.0026 |
| S3 | Aspheric | 3.1263 | 0.6427 | 1.67 | 19.20 | 17.08 | 2.0670 |
| S4 | Aspheric | 3.9003 | 0.4405 | | | | 9.4625 |
| S5 | Aspheric | 5.2960 | 0.3139 | 1.54 | 56.00 | 12.04 | −13.7772 |
| S6 | Aspheric | 26.0141 | 0.1528 | | | | −34.9344 |
| STO | Spherical | infinite | 0.0250 | | | | |
| S7 | Aspheric | 4.0649 | 0.8401 | 1.54 | 56.00 | 1.98 | 1.0096 |
| S8 | Aspheric | −1.3721 | 0.0500 | | | | −17.0630 |
| S9 | Aspheric | −290.5883 | 0.3161 | 1.67 | 19.20 | −4.78 | 99.0000 |
| S10 | Aspheric | 3.3297 | 0.7195 | | | | −10.9695 |
| S11 | Aspheric | −4.2093 | 0.8004 | 1.54 | 56.00 | 1.79 | −1.2913 |
| S12 | Aspheric | −0.8524 | 0.0627 | | | | −4.0527 |
| S13 | Aspheric | 2.7228 | 0.5221 | 1.64 | 23.50 | −1.98 | −0.2505 |
| S14 | Aspheric | 0.8103 | 0.6797 | | | | −5.2247 |
| S15 | Spherical | infinite | 0.2100 | 1.52 | 54.50 | | |
| S16 | Spherical | infinite | 0.1069 | | | | |
| S17 | Spherical | infinite | | | | | |

TABLE 6-1

| Surface number | A4 | A6 | A8 | A10 | A12 | A14 | A16 |
|---|---|---|---|---|---|---|---|
| S1 | 2.4225E−02 | −1.2236E−02 | 6.0694E−03 | −2.0960E−03 | 4.1865E−04 | −1.2579E−05 | −1.9087E−05 |
| S2 | 2.5979E−02 | 2.9621E−03 | −1.4123E−01 | 4.7797E−01 | −9.0200E−01 | 1.1744E+00 | −1.1346E+00 |
| S3 | 7.5154E−02 | −2.4000E−01 | 1.3723E+00 | −4.7141E+00 | 1.0944E+01 | −1.7864E+01 | 2.0938E+01 |
| S4 | 1.8741E−01 | −1.2996E+00 | 1.6490E+01 | −1.2963E+02 | 6.9192E+02 | −2.6124E+03 | 7.1354E+03 |
| S5 | −7.1425E−02 | 1.8609E+00 | −3.2332E+01 | 3.3867E+02 | −2.4098E+03 | 1.2078E+04 | −4.3614E+04 |
| S6 | −8.9138E−03 | −7.5482E−01 | 1.2136E+01 | −1.5639E+02 | 1.4659E+03 | −1.0167E+04 | 5.2043E+04 |
| S7 | 4.2415E−02 | 4.9575E−01 | −1.7183E+01 | 3.3013E+02 | −4.0568E+03 | 3.3599E+04 | −1.9376E+05 |
| S8 | −4.1227E−01 | −1.9776E+00 | 5.4919E+01 | −6.2223E+02 | 4.4228E+03 | −2.1388E+04 | 7.2911E+04 |
| S9 | −1.2442E−02 | −1.5115E−01 | −8.3651E+00 | 1.0594E+02 | −7.3121E+02 | 3.3335E+03 | −1.0590E+04 |
| S10 | −8.6212E−02 | −1.0025E−01 | 7.9590E−01 | −2.7457E+00 | 5.2077E+00 | −2.8453E+00 | −1.1237E+01 |
| S11 | 5.0884E−02 | −4.5556E−02 | 1.2999E−01 | −4.3479E−01 | 9.2924E−01 | −1.3060E+00 | 1.2742E+00 |
| S12 | −1.0673E−01 | 9.6871E−02 | −4.4435E−02 | 5.6030E−02 | −2.1928E−01 | 4.3028E−01 | −4.7616E−01 |
| S13 | −1.2769E−01 | 2.6094E−02 | 1.2052E−03 | −4.7063E−03 | 3.6747E−03 | −2.0120E−03 | 7.7767E−04 |
| S14 | −3.4133E−02 | −1.5158E−02 | 2.9998E−02 | −2.3850E−02 | 1.2152E−02 | −4.2954E−03 | 1.0825E−03 |

TABLE 6-2

| Surface number | A18 | A20 | A22 | A24 | A26 | A28 | A30 |
|---|---|---|---|---|---|---|---|
| S1 | 6.2933E−06 | −1.0996E−06 | 1.2306E−07 | −9.0981E−09 | 4.3191E−10 | −1.1969E−11 | 1.4753E−13 |
| S2 | 8.3286E−01 | −4.6219E−01 | 1.8939E−01 | −5.5148E−02 | 1.0737E−02 | −1.2486E−03 | 6.5397E−05 |
| S3 | −1.7757E+01 | 1.0856E+01 | −4.7066E+00 | 1.3994E+00 | −2.6800E−01 | 2.9203E−02 | −1.3277E−03 |
| S4 | −1.4236E+04 | 2.0722E+04 | −2.1741E+04 | 1.5994E+04 | −7.8220E+03 | 2.2828E+03 | −3.0074E+02 |
| S5 | 1.1474E+05 | −2.2003E+05 | 3.0408E+05 | −2.9481E+05 | 1.9017E+05 | −7.3262E+04 | 1.2748E+04 |
| S6 | −1.9534E+05 | 5.3272E+05 | −1.0393E+06 | 1.4099E+06 | −1.2614E+06 | 6.6850E+05 | −1.5886E+05 |
| S7 | 7.9220E+05 | −2.3090E+06 | 4.7636E+06 | −6.7936E+06 | 6.3695E+06 | −3.5321E+06 | 8.7786E+05 |
| S8 | −1.7825E+05 | 3.1385E+05 | −3.9455E+05 | 3.4539E+05 | −1.9996E+05 | 6.8805E+04 | −1.0652E+04 |
| S9 | 2.3915E+04 | −3.8560E+04 | 4.3995E+04 | −3.4631E+04 | 1.7856E+04 | −5.4166E+03 | 7.3124E+02 |
| S10 | 3.3488E+01 | −4.7265E+01 | 4.1265E+01 | −2.3331E+01 | 8.3531E+00 | −1.7273E+00 | 1.5750E−01 |
| S11 | −8.9201E−01 | 4.5432E−01 | −1.6760E−01 | 4.3702E−02 | −7.6371E−03 | 8.0172E−04 | −3.8165E−05 |
| S12 | 3.3424E−01 | −1.5703E−01 | 5.0272E−02 | −1.0864E−02 | 1.5204E−03 | −1.2464E−04 | 4.5506E−06 |
| S13 | −2.1033E−04 | 3.9844E−05 | −5.2645E−06 | 4.7588E−07 | −2.8097E−08 | 9.7788E−10 | −1.5236E−11 |
| S14 | −1.9670E−04 | 2.5787E−05 | −2.4131E−06 | 1.5701E−07 | −6.7429E−09 | 1.7173E−10 | −1.9637E−12 |

Figures 6A, 6B:
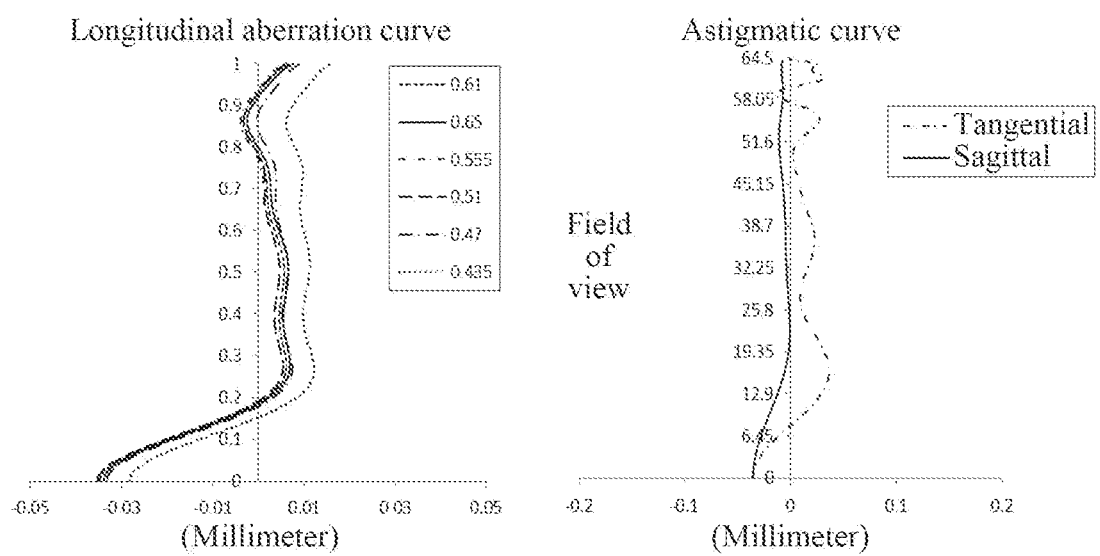
FIGS. 6A-6C respectively illustrate a longitudinal aberration curve, an astigmatic curve and a distortion curve of the camera lens assembly according to Example 3.
Figure 6C:
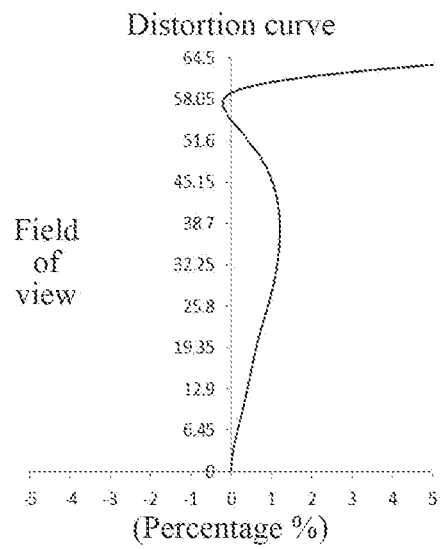

FIG. 6A illustrates the longitudinal aberration curve of the camera lens assembly according to Example 3, representing deviations of focal points converged by light of different wavelengths after passing through the lens assembly. FIG. 6B illustrates the astigmatic curve of the camera lens assembly according to Example 3, representing a curvature of a tangential plane and a curvature of a sagittal plane. FIG. 6C illustrates the distortion curve of the camera lens assembly according to Example 3, representing the amounts of distortion corresponding to different field-of-views. It can be seen from FIG. 6A to FIG. 6C that the camera lens assembly provided in Example 3 can achieve good imaging quality.

Example 4

Figure 7:
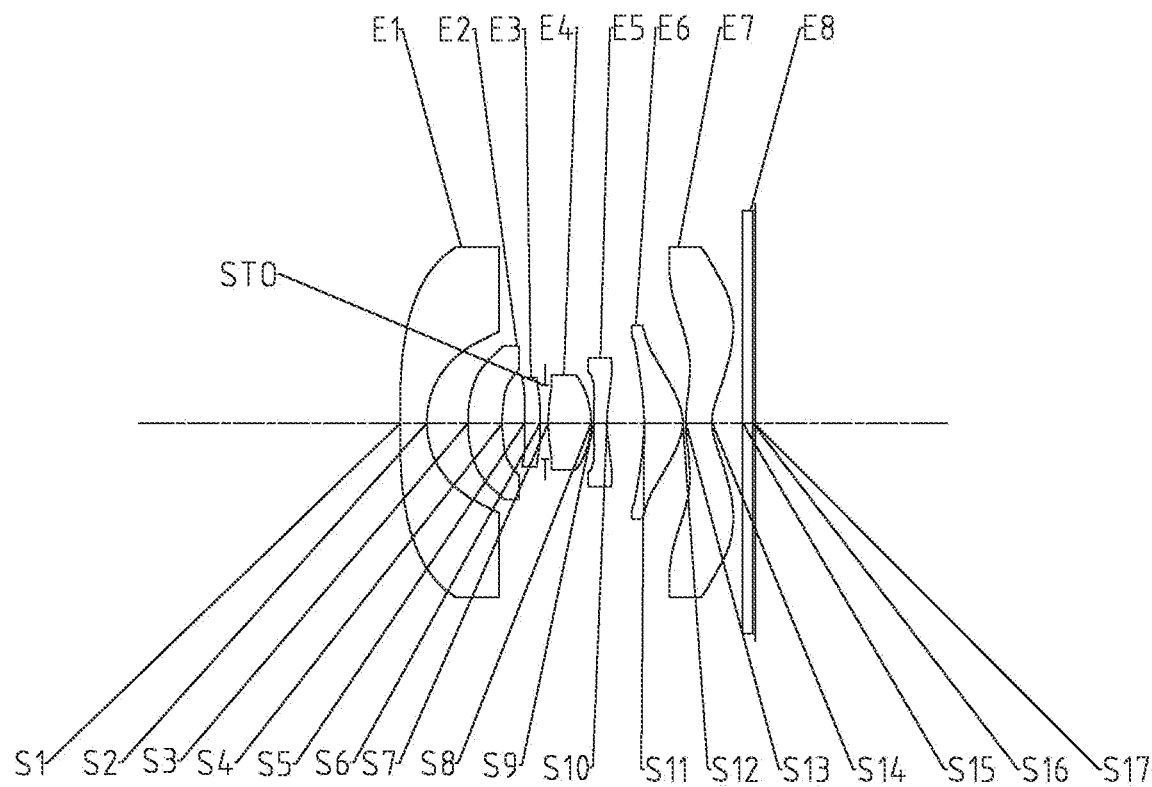
FIG. 7 is a schematic structural diagram illustrating a camera lens assembly according to Example 4 of the present disclosure.

A camera lens assembly according to Example 4 of the present disclosure is described below with reference to FIG. 7 to FIG. 8C. FIG. 7 illustrates a schematic structural diagram of the camera lens assembly according to Example 4 of the present disclosure.

As shown in FIG. 7, the camera lens assembly from an object side to an image side sequentially includes: a first lens E1, a second lens E2, a third lens E3, a diaphragm STO, a fourth lens E4, a fifth lens E5, a sixth lens E6, a seventh lens E7, an optical filter E8 and an image plane S17.

The first lens E1 has negative refractive power, an object-side surface S1 of the first lens is a convex surface, and an image-side surface S2 of the first lens is a concave surface. The second lens E2 has positive refractive power, an object-side surface S3 of the second lens is a convex surface, and an image-side surface S4 of the second lens is a concave surface. The third lens E3 has positive refractive power, an object-side surface S5 of the third lens is a concave surface, and an image-side surface S6 of the third lens is a convex surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a convex surface, and an image-side surface S10 of the fifth lens is a concave surface. The sixth lens E6 has positive refractive power, an object-side surface S11 of the sixth lens is a concave surface, and an image-side surface S12 of the sixth lens is a convex surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. Light from an object sequentially passes through the surfaces S1 to S16 and is finally imaged on the image plane S17.

In this example, the total effective focal length f of the camera lens assembly is 1.60 mm, and the maximum field-of-view FOV of the camera lens assembly is 133.6.

Table 7 is a table illustrating basic parameters of the camera lens assembly of Example 4, where the units for the radius of curvature, the thickness/distance and the focal length are millimeter (mm). Tables 8-1 and 8-2 show high-order coefficients applicable to each aspheric surface in Example 4, where the surface shape of each aspheric surface may be defined by the formula (1) given in the above Example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | infinite | | | | |
| S1 | Aspheric | 163.1366 | 0.5292 | 1.54 | 56.00 | −3.28 | −98.9996 |
| S2 | Aspheric | 1.7816 | 0.8207 | | | | −0.0031 |
| S3 | Aspheric | 3.1547 | 0.6798 | 1.67 | 19.20 | 13.17 | 1.9870 |
| S4 | Aspheric | 4.4116 | 0.4464 | | | | 11.1553 |
| S5 | Aspheric | −1017501.6386 | 0.3086 | 1.54 | 56.00 | 14.72 | 24.6809 |
| S6 | Aspheric | −8.0888 | 0.1361 | | | | −63.5713 |
| STO | Spherical | infinite | 0.0250 | | | | |
| S7 | Aspheric | 4.0174 | 0.8549 | 1.54 | 56.00 | 2.02 | 2.3106 |
| S8 | Aspheric | −1.4207 | 0.0480 | | | | −18.4515 |
| S9 | Aspheric | 5.8157 | 0.2627 | 1.67 | 19.20 | −5.70 | −37.7190 |
| S10 | Aspheric | 2.3014 | 0.7433 | | | | −8.9754 |
| S11 | Aspheric | −4.0633 | 0.7705 | 1.54 | 56.00 | 1.80 | −1.5312 |
| S12 | Aspheric | −0.8451 | 0.0568 | | | | −4.0134 |
| S13 | Aspheric | 2.7348 | 0.5161 | 1.64 | 23.50 | −2.15 | −0.2381 |
| S14 | Aspheric | 0.8575 | 0.6112 | | | | −5.3341 |
| S15 | Spherical | infinite | 0.2100 | 1.52 | 54.50 | | |
| S16 | Spherical | infinite | 0.0403 | | | | |
| S17 | Spherical | infinite | | | | | |

TABLE 8-1

| Surface number | A4 | A6 | A8 | A10 | A12 | A14 | A16 |
|---|---|---|---|---|---|---|---|
| S1 | 2.8203E−02 | −1.5019E−02 | 5.6609E−03 | −2.9733E−04 | −8.8954E−04 | 5.2273E−04 | −1.6327E−04 |
| S2 | 8.7092E−02 | −5.2421E−01 | 2.3110E+00 | −6.5286E+00 | 1.2331E+01 | −1.6189E+01 | 1.5187E+01 |
| S3 | 6.3891E−02 | −5.5482E−02 | 3.6125E−01 | −1.5772E+00 | 4.9207E+00 | −1.0620E+01 | 1.5950E+01 |
| S4 | 1.7467E−01 | −2.1488E−01 | −4.8669E−01 | 2.2890E+01 | −1.9336E+02 | 9.0382E+02 | −2.7274E+03 |
| S5 | 7.0937E−02 | −2.2403E+00 | 3.0945E+01 | −2.9796E+02 | 2.0019E+03 | −9.6742E+03 | 3.4201E+04 |
| S6 | 5.6673E−03 | −7.5926E−01 | 1.0370E+01 | −1.2991E+02 | 1.2173E+03 | −8.3868E+03 | 4.2264E+04 |
| S7 | 7.9908E−02 | −6.1284E−01 | 1.6120E+01 | −2.8305E+02 | 3.2066E+03 | −2.4658E+04 | 1.3287E+05 |
| S8 | −3.5619E−01 | −2.8312E+00 | 5.4227E+01 | −5.0413E+02 | 3.0795E+03 | −1.3159E+04 | 4.0363E+04 |
| S9 | 5.4562E−02 | −2.0679E+00 | 1.4973E+01 | −8.5590E+01 | 4.0225E+02 | −1.5323E+03 | 4.5742E+03 |
| S10 | −7.5954E−02 | −1.9760E+00 | 1.3051E+00 | −4.4304E+00 | 9.6339E+00 | −1.2552E+01 | 5.5881E+00 |
| S11 | 5.5671E−02 | −1.3450E−01 | 6.0162E−01 | −1.8601E+00 | 3.7233E+00 | −5.0811E+00 | 4.8884E+00 |

TABLE 8-1-continued

| Surface number | A4 | A6 | A8 | A10 | A12 | A14 | A16 |
|---|---|---|---|---|---|---|---|
| S12 | −7.9804E−02 | −1.8980E−01 | 1.0873E+00 | −2.5354E+00 | 3.7711E+00 | −3.9556E+00 | 3.0496E+00 |
| S13 | −9.7563E−02 | −1.0867E−01 | 2.7426E−01 | −3.2504E−01 | 2.4294E−01 | −1.2262E−01 | 4.3282E−02 |
| S14 | −3.8509E−02 | −8.2059E−03 | 5.2672E−03 | 1.4563E−02 | −1.8898E−02 | 1.0887E−02 | −3.7807E−03 |

TABLE 8-2

| Surface number | A18 | A20 | A22 | A24 | A26 | A28 | A30 |
|---|---|---|---|---|---|---|---|
| S1 | 3.3286E−05 | −4.6811E−06 | 4.5942E−07 | −3.0989E−08 | 1.3717E−09 | −3.5916E−11 | 4.2188E−13 |
| S2 | −1.0335E+01 | 5.1164E+00 | −1.8247E+00 | 4.5659E−01 | −7.6032E−02 | 7.5608E−03 | −3.3943E−04 |
| S3 | −1.6867E+01 | 1.2624E+01 | −6.6449E+00 | 2.4033E+00 | −5.6790E−01 | 7.8842E−02 | −4.8693E−03 |
| S4 | 5.6095E+03 | −8.0042E+03 | 7.8794E+03 | −5.1968E+03 | 2.1526E+03 | −4.8817E+02 | 4.2333E+01 |
| S5 | −8.9052E+04 | 1.7032E+05 | −2.3606E+05 | 2.3045E+05 | −1.5011E+05 | 5.8525E+04 | −1.0325E+04 |
| S6 | −1.5527E+05 | 4.1321E+05 | −7.8552E+05 | 1.0374E+06 | −9.0279E+05 | 4.6491E+05 | −1.0723E+05 |
| S7 | −5.1033E+05 | 1.4024E+06 | −2.7315E+06 | 3.6721E+06 | −3.2298E+06 | 1.6657E+06 | −3.7989E+05 |
| S8 | −8.9861E+04 | 1.4519E+05 | −1.6825E+05 | 1.3602E+05 | −7.2718E+04 | 2.3063E+04 | −3.2801E+03 |
| S9 | −1.0392E+04 | 1.7543E+04 | −2.1477E+04 | 1.8437E+04 | −1.0491E+04 | 3.5469E+03 | −5.3856E+02 |
| S10 | 1.1733E+01 | −2.7047E+01 | 2.8162E+01 | −1.7639E+01 | 6.8037E+00 | −1.4963E+00 | 1.4412E−01 |
| S11 | −3.3654E+00 | 1.6590E+00 | −5.7793E−01 | 1.3797E−01 | −2.1284E−02 | 1.8872E−03 | −7.1601E−05 |
| S12 | −1.7526E+00 | 7.4819E−01 | −2.3312E−01 | 5.1282E−02 | −7.5162E−03 | 6.5655E−04 | −2.5795E−05 |
| S13 | −1.0884E−02 | 1.9603E−03 | −2.5097E−04 | 2.2291E−05 | −1.3056E−06 | 4.5333E−08 | −7.0676E−10 |
| S14 | 8.6748E−04 | −1.3633E−04 | 1.4789E−05 | −1.0906E−06 | 5.2251E−08 | −1.4676E−09 | 1.8349E−11 |

Figure 8A:
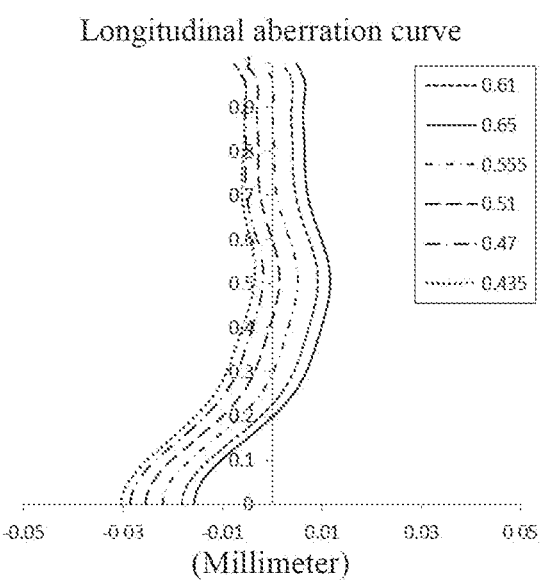
FIGS. 8A-8C respectively illustrate a longitudinal aberration curve, an astigmatic curve and a distortion curve of the camera lens assembly according to Example 4.
Figure 8B:
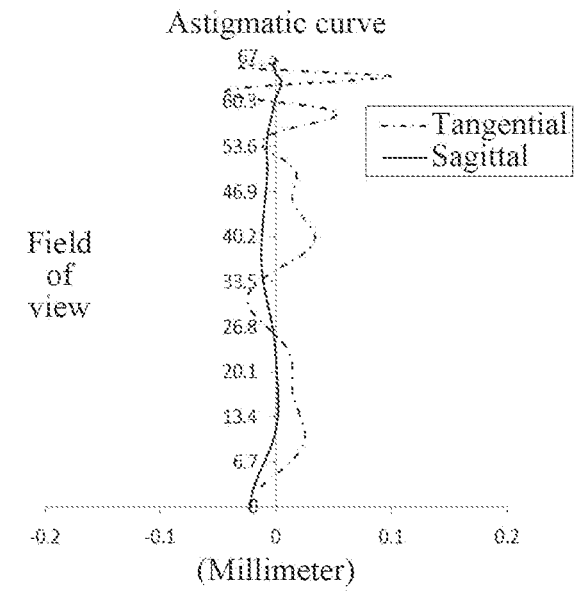
Figure 8C:
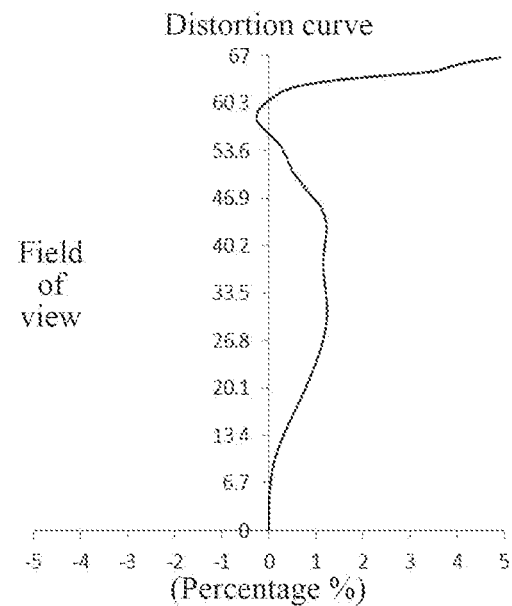

FIG. 8A illustrates the longitudinal aberration curve of the camera lens assembly according to Example 4, representing deviations of focal points converged by light of different wavelengths after passing through the lens assembly. FIG. 8B illustrates the astigmatic curve of the camera lens assembly according to Example 4, representing a curvature of a tangential plane and a curvature of a sagittal plane. FIG. 8C illustrates the distortion curve of the camera lens assembly according to Example 4, representing the amounts of distortion corresponding to different field-of-views. It can be seen from FIG. 8A to FIG. 8C that the camera lens assembly provided in Example 4 can achieve good imaging quality.

Example 5

Figure 9:
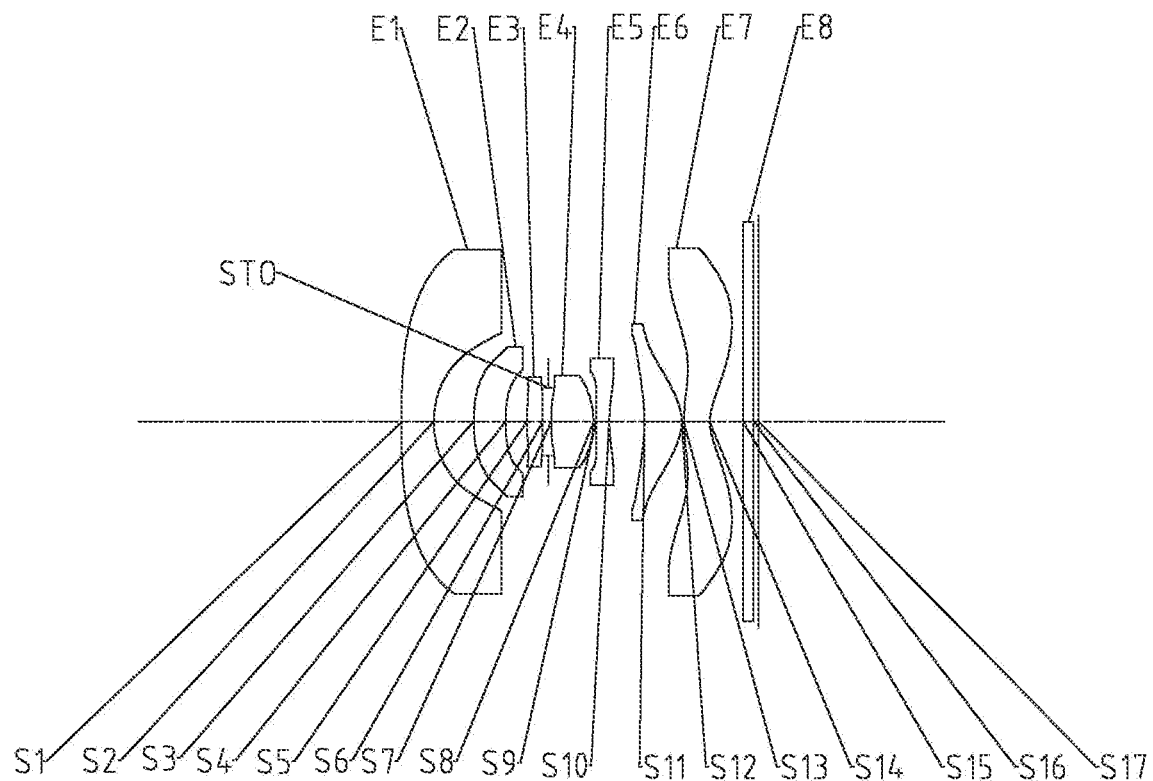
FIG. 9 is a schematic structural diagram illustrating a camera lens assembly according to Example 5 of the present disclosure.

A camera lens assembly according to Example 5 of the present disclosure is described below with reference to FIG. 9 to FIG. 10C. FIG. 9 illustrates a schematic structural diagram of the camera lens assembly according to Example 5 of the present disclosure.

As shown in FIG. 9, the camera lens assembly from an object side to an image side sequentially includes: a first lens E1, a second lens E2, a third lens E3, a diaphragm STO, a fourth lens E4, a fifth lens E5, a sixth lens E6, a seventh lens E7, an optical filter E8 and an image plane S17.

The first lens E1 has negative refractive power, an object-side surface S1 of the first lens is a convex surface, and an image-side surface S2 of the first lens is a concave surface. The second lens E2 has positive refractive power, an object-side surface S3 of the second lens is a convex surface, and an image-side surface S4 of the second lens is a concave surface. The third lens E3 has positive refractive power, an object-side surface S5 of the third lens is a convex surface, and an image-side surface S6 of the third lens is a concave surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a convex surface, and an image-side surface S10 of the fifth lens is a concave surface. The sixth lens E6 has positive refractive power, an object-side surface S11 of the sixth lens is a concave surface, and an image-side surface S12 of the sixth lens is a convex surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. Light from an object sequentially passes through the surfaces S1 to S16 and is finally imaged on the image plane S17.

In this example, the total effective focal length f of the camera lens assembly is 1.74 mm, and the maximum field-of-view FOV of the camera lens assembly is 130.3.

Table 9 is a table illustrating basic parameters of the camera lens assembly of Example 5, where the units for the radius of curvature, the thickness/distance and the focal length are millimeter (mm). Tables 10-1 and 10-2 show high-order coefficients applicable to each aspheric surface in Example 5, where the surface shape of each aspheric surface may be defined by the formula (1) given in the above Example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | infinite | | | | |
| S1 | Aspheric | 72.2426 | 0.6440 | 1.54 | 56.00 | −3.39 | −0.3222 |
| S2 | Aspheric | 1.8107 | 0.7940 | | | | −0.0053 |
| S3 | Aspheric | 3.1322 | 0.6383 | 1.67 | 19.20 | 18.01 | 1.9762 |
| S4 | Aspheric | 3.8422 | 0.4213 | | | | 9.2529 |
| S5 | Aspheric | 5.3868 | 0.3156 | 1.54 | 56.00 | 10.92 | −13.9461 |
| S6 | Aspheric | 51.7679 | 0.1460 | | | | 60.6990 |
| STO | Spherical | infinite | 0.0250 | | | | |
| S7 | Aspheric | 4.2038 | 0.8479 | 1.54 | 56.00 | 2.07 | 1.0255 |
| S8 | Aspheric | −1.4440 | 0.0476 | | | | −17.4532 |
| S9 | Aspheric | 6.4996 | 0.2612 | 1.67 | 19.20 | −5.90 | −43.9776 |
| S10 | Aspheric | 2.4593 | 0.7035 | | | | −9.0821 |
| S11 | Aspheric | −3.9806 | 0.7439 | 1.54 | 56.00 | 1.83 | −1.8276 |
| S12 | Aspheric | −0.8569 | 0.0380 | | | | −4.2692 |
| S13 | Aspheric | 2.7194 | 0.5184 | 1.64 | 23.50 | −2.04 | −0.2391 |
| S14 | Aspheric | 0.8257 | 0.6660 | | | | −5.4630 |
| S15 | Spherical | infinite | 0.2100 | 1.52 | 54.50 | | |
| S16 | Spherical | infinite | 0.0930 | | | | |
| S17 | Spherical | infinite | | | | | |

TABLE 10-1

| Surface number | A4 | A6 | A8 | A10 | A12 | A14 | A16 |
|---|---|---|---|---|---|---|---|
| S1 | 1.9159E−02 | −3.9940E−03 | 6.5963E−04 | −7.4780E−05 | 5.8485E−06 | −2.5275E−07 | 2.5337E−09 |
| S2 | −9.8172E−04 | 7.6128E−02 | −1.2976E−01 | −1.0197E−02 | 5.2775E−01 | −1.1836E+00 | 1.4624E+00 |
| S3 | 5.4062E−02 | 1.2278E−02 | 7.8890E−03 | −1.6871E−02 | 1.5671E−02 | −8.0534E−03 | 1.4386E−03 |
| S4 | 1.4256E−01 | −6.3422E−03 | 1.3780E−01 | −3.4956E−01 | 5.9038E−01 | −5.5586E−01 | 2.0525E−01 |
| S5 | −9.8398E−03 | −1.5157E−02 | −4.7165E−01 | 1.0200E+00 | −1.4821E+00 | 1.2578E+00 | −4.2578E−01 |
| S6 | −8.7690E−03 | −2.0374E−01 | 3.5568E−01 | −1.1594E+00 | 2.2168E+00 | −1.9918E+00 | 7.3407E−01 |
| S7 | 5.7668E−02 | −3.7137E−02 | 3.8158E−02 | −6.9332E−01 | 2.5028E+00 | −3.9297E+00 | 2.2059E+00 |
| S8 | −4.8742E−01 | 1.1463E+00 | −2.5795E+00 | 4.2659E+00 | −4.8638E+00 | 3.1965E+00 | −9.2585E−01 |
| S9 | −5.1702E−02 | −4.7359E−01 | 1.4641E+00 | −2.8176E+00 | 3.0912E+00 | −1.8720E+00 | 4.4192E−01 |
| S10 | −9.9111E−02 | 5.4130E−02 | −2.5716E−02 | 2.7219E−03 | −2.9341E−03 | 4.1003E−03 | −1.1098E−03 |
| S11 | 3.6274E−02 | 5.3007E−02 | −2.9258E−01 | 6.2442E−01 | −7.9666E−01 | 6.6154E−01 | −3.6748E−01 |
| S12 | −1.0230E−01 | 7.1642E−02 | 3.5844E−02 | −1.6477E−01 | 2.3624E−01 | −1.9544E−01 | 1.0112E−01 |
| S13 | −1.3457E−01 | 3.5043E−02 | −9.9054E−03 | 5.3721E−03 | −2.7660E−03 | 9.4159E−04 | −2.0707E−04 |
| S14 | −4.1740E−02 | 9.2841E−03 | −2.2759E−03 | 1.0807E−03 | −4.8191E−04 | 1.3507E−04 | −2.3713E−05 |

TABLE 10-2

| Surface number | A18 | A20 | A22 | A24 | A26 | A28 | A30 |
|---|---|---|---|---|---|---|---|
| S1 | 1.4540E−10 | 0.0000E+00 | 0.0000E+00 | 0.0000E+00 | 0.0000E+00 | 0.0000E+00 | 0.0000E+00 |
| S2 | −1.1863E+00 | 6.6633E−01 | −2.6229E−01 | 7.1247E−02 | −1.2735E−02 | 1.3469E−03 | −6.3745E−05 |
| S3 | 0.0000E+00 | 0.0000E+00 | 0.0000E+00 | 0.0000E+00 | 0.0000E+00 | 0.0000E+00 | 0.0000E+00 |
| S4 | 0.0000E+00 | 0.0000E+00 | 0.0000E+00 | 0.0000E+00 | 0.0000E+00 | 0.0000E+00 | 0.0000E+00 |
| S5 | 0.0000E+00 | 0.0000E+00 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 | 0.0000E+00 | 0.0000E+00 |
| S7 | 0.0000E+00 | 0.0000E+00 | 0.0000E+00 | 0.0000E+00 | 0.0000E+00 | 0.0000E+00 | 0.0000E+00 |
| S8 | 0.0000E+00 | 0.0000E+00 | 0.0000E+00 | 0.0000E+00 | 0.0000E+00 | 0.0000E+00 | 0.0000E+00 |
| S9 | 0.0000E+00 | 0.0000E+00 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 | 0.0000E+00 | 0.0000E+00 |
| S11 | 1.3606E−01 | −3.2319E−02 | 4.4608E−03 | −2.7212E−04 | 0.0000E+00 | 0.0000E+00 | 0.0000E+00 |
| S12 | −3.3091E−02 | 6.6507E−03 | −7.4926E−04 | 3.6240E−05 | 0.0000E+00 | 0.0000E+00 | 0.0000E+00 |
| S13 | 2.9378E−05 | −2.6032E−06 | 1.3117E−07 | −2.8719E−09 | 0.0000E+00 | 0.0000E+00 | 0.0000E+00 |
| S14 | 2.6383E−06 | −1.8131E−07 | 7.0360E−09 | −1.1813E−10 | 0.0000E+00 | 0.0000E+00 | 0.0000E+00 |

Figures 10A, 10B:
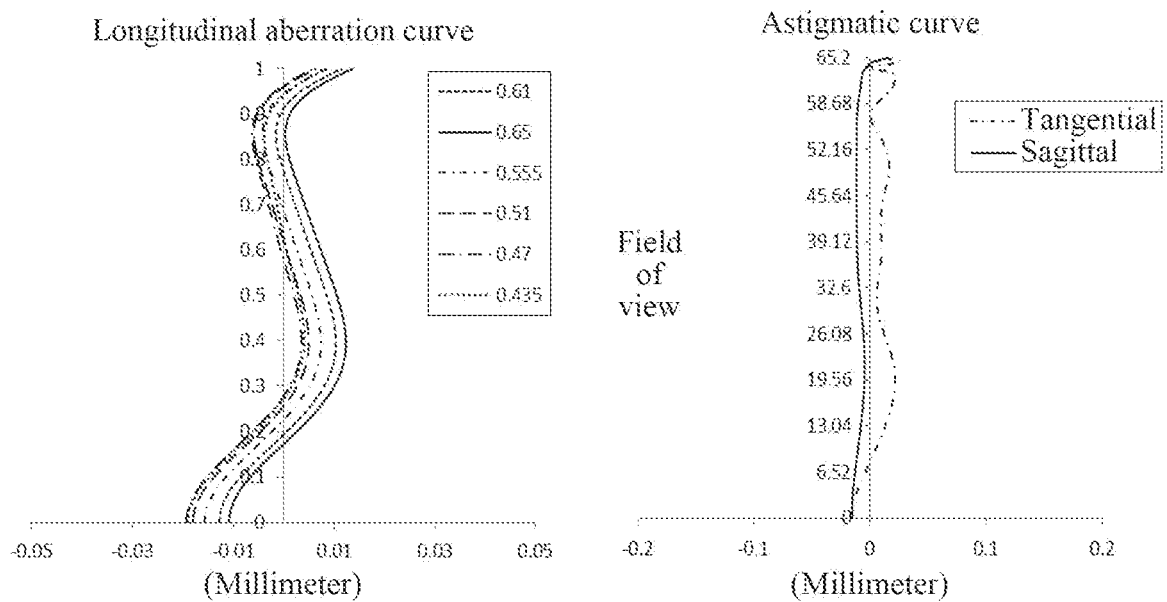
FIGS. 10A-10C respectively illustrate a longitudinal aberration curve, an astigmatic curve and a distortion curve of the camera lens assembly according to Example 5.
Figure 10C:
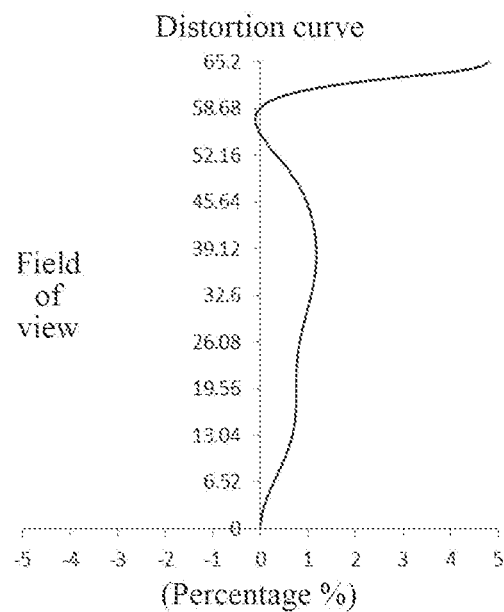

FIG. 10A illustrates the longitudinal aberration curve of the camera lens assembly according to Example 5, representing deviations of focal points converged by light of different wavelengths after passing through the lens assembly. FIG. 10B illustrates the astigmatic curve of the camera lens assembly according to Example 5, representing a curvature of a tangential plane and a curvature of a sagittal plane. FIG. 10C illustrates the distortion curve of the camera lens assembly according to Example 5, representing the amounts of distortion corresponding to different field-ofviews. It can be seen from FIG. 10A to FIG. 10C that the camera lens assembly provided in Example 5 can achieve good imaging quality.

Example 6

Figure 11:
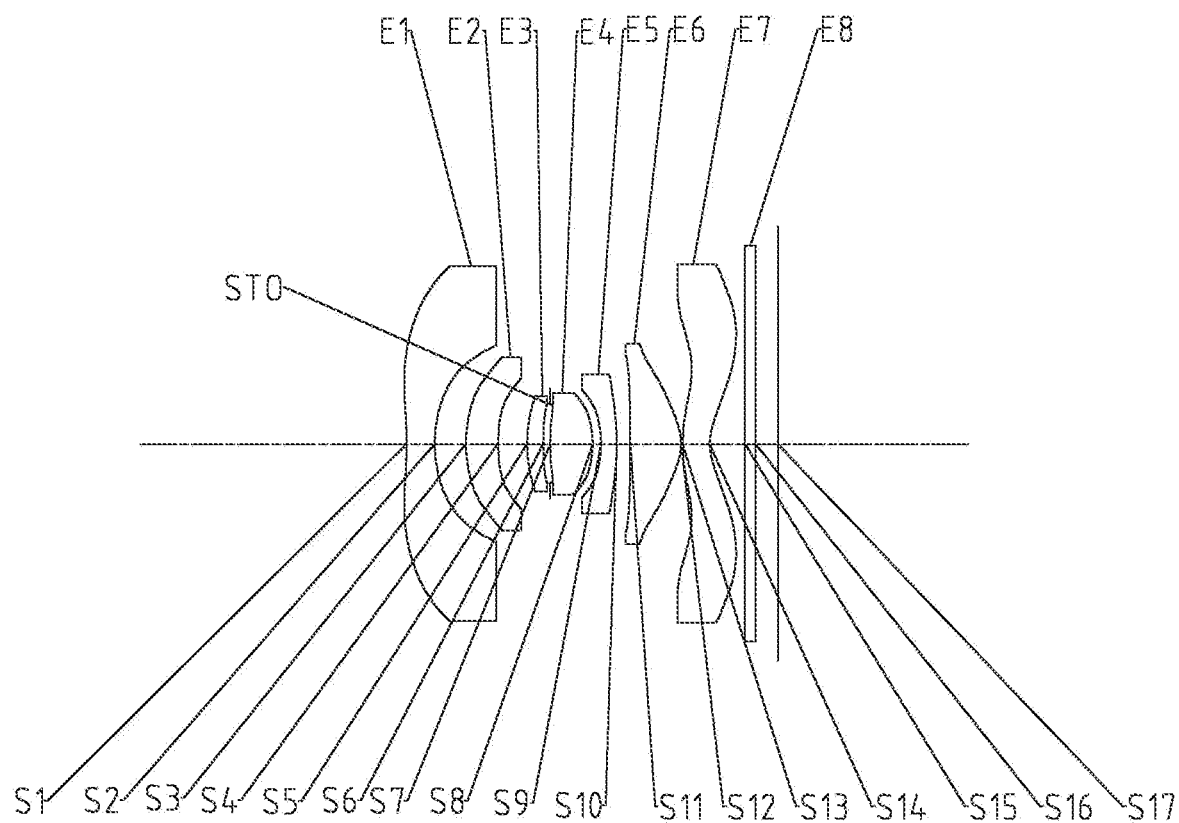
FIG. 11 is a schematic structural diagram illustrating a camera lens assembly according to Example 6 of the present disclosure.

A camera lens assembly according to Example 6 of the present disclosure is described below with reference to FIG. 11 to FIG. 12C. FIG. 11 illustrates a schematic structural diagram of the camera lens assembly according to Example 6 of the present disclosure.

As shown in FIG. 11, the camera lens assembly from an object side to an image side sequentially includes: a first lens E1, a second lens E2, a third lens E3, a diaphragm STO, a fourth lens E4, a fifth lens E5, a sixth lens E6, a seventh lens E7, an optical filter E8 and an image plane S17.

The first lens E1 has negative refractive power, an object-side surface S1 of the first lens is a concave surface, and an image-side surface S2 of the first lens is a concave surface. The second lens E2 has positive refractive power, an object-side surface S3 of the second lens is a convex surface, and an image-side surface S4 of the second lens is a concave surface. The third lens E3 has positive refractive power, an object-side surface S5 of the third lens is a convex surface, and an image-side surface S6 of the third lens is a concave surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a convex surface. The sixth lens E6 has positive refractive power, an object-side surface S11 of the sixth lens is a concave surface, and an image-side surface S12 of the sixth lens is a convex surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. Light from an object sequentially passes through the surfaces S1 to S16 and is finally imaged on the image plane S17.

In this example, the total effective focal length f of the camera lens assembly is 1.75 mm, and the maximum field-of-view FOV of the camera lens assembly is 131.8.

Table 11 is a table illustrating basic parameters of the camera lens assembly of Example 6, where the units for the radius of curvature, the thickness/distance and the focal length are millimeter (mm). Tables 12-1 and 12-2 show high-order coefficients applicable to each aspheric surface in Example 6, where the surface shape of each aspheric surface may be defined by the formula (1) given in the above Example 1.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | infinite | | | | |
| S1 | Aspheric | −5.1018 | 0.5426 | 1.54 | 56.00 | −2.91 | −15.2196 |
| S2 | Aspheric | 2.3904 | 0.6084 | | | | 0.5823 |
| S3 | Aspheric | 2.3240 | 0.6235 | 1.67 | 19.20 | 9.35 | 0.1094 |
| S4 | Aspheric | 3.2722 | 0.5677 | | | | −11.5635 |
| S5 | Aspheric | 3.1296 | 0.3105 | 1.54 | 56.00 | 9.01 | 3.0051 |
| S6 | Aspheric | 6.5215 | 0.1128 | | | | 0.7823 |
| STO | Spherical | infinite | 0.0250 | | | | |
| S7 | Aspheric | 5.2852 | 0.8270 | 1.54 | 56.00 | 2.60 | 4.6224 |
| S8 | Aspheric | −1.8360 | 0.1590 | | | | −0.7571 |
| S9 | Aspheric | −2.2227 | 0.3069 | 1.67 | 19.20 | −6.97 | 0.6332 |
| S10 | Aspheric | −4.4964 | 0.2631 | | | | 4.0711 |
| SU | Aspheric | −8.1913 | 0.9903 | 1.54 | 56.00 | 1.61 | −18.6991 |
| S12 | Aspheric | −0.8295 | 0.0256 | | | | −4.3503 |
| S13 | Aspheric | 3.2959 | 0.5266 | 1.64 | 23.50 | −1.99 | −7.8750 |
| S14 | Aspheric | 0.8646 | 0.6870 | | | | −6.2974 |
| S15 | Spherical | infinite | 0.2100 | 1.52 | 54.50 | | |
| S16 | Spherical | infinite | 0.4293 | | | | |
| S17 | Spherical | infinite | | | | | |

TABLE 12-1

| Surface number | A4 | A6 | A8 | A10 | A12 | A14 | A16 |
|---|---|---|---|---|---|---|---|
| S1 | 5.3057E−02 | −1.9621E−02 | 6.1275E−03 | −1.3907E−03 | 2.1699E−04 | −2.2601E−05 | 1.5136E−06 |
| S2 | −6.1457E−02 | 3.7930E−01 | −1.5231E+00 | 4.0545E+00 | −7.2444E+00 | 9.0095E+00 | −7.9984E+00 |
| S3 | −6.0413E−02 | 7.8388E−02 | −3.2531E−02 | 3.1830E−02 | −2.9781E−02 | 1.2769E−02 | −2.5122E−03 |
| S4 | 1.1547E−01 | −8.0674E−02 | 7.5041E−01 | −1.8894E+00 | 2.7556E+00 | −2.4703E+00 | 1.2784E+00 |
| S5 | 5.6823E−02 | 1.5704E−01 | −9.9310E−01 | 2.9728E+00 | −5.2525E+00 | 4.6857E+00 | −1.5912E+00 |
| S6 | 1.1809E−01 | −1.3388E−01 | 6.8842E−01 | −1.7941E+00 | 1.8434E+00 | 0.0000E+00 | 0.0000E+00 |
| S7 | 2.5931E−02 | 3.1465E−02 | −4.9137E−01 | 1.9324E+00 | −4.6507E+00 | 5.8036E+00 | −2.7963E+00 |
| S8 | −4.9626E−02 | −2.1740E+00 | 3.0190E+01 | −2.8477E+02 | 1.8399E+03 | −8.3531E+03 | 2.7179E+04 |
| S9 | −1.2003E−01 | 8.4437E−01 | −1.5843E+01 | 1.3754E+02 | −7.6861E+02 | 3.0160E+03 | −8.5533E+03 |
| S10 | 1.1483E−01 | −4.3916E−01 | 7.8364E−01 | −7.2089E−01 | 3.6070E−01 | −8.8268E−02 | 5.8271E−03 |
| S11 | 1.3869E−01 | −1.3674E−01 | −9.9430E−03 | 1.2152E−01 | −1.1540E−01 | 5.8056E−02 | −1.7494E−02 |

TABLE 12-1-continued

| Surface number | A4 | A6 | A8 | A10 | A12 | A14 | A16 |
|---|---|---|---|---|---|---|---|
| S12 | 6.7124E−02 | −1.9155E−01 | 3.1649E−01 | −3.4578E−01 | 2.3281E−01 | −9.6299E−02 | 2.4120E−02 |
| S13 | 1.3199E−01 | −3.1912E−01 | 4.1247E−01 | −3.7628E−01 | 2.3771E−01 | −1.0445E−01 | 3.2328E−02 |
| S14 | 1.5921E−02 | −2.6944E−02 | 1.6603E−02 | −1.1602E−02 | 6.7419E−03 | −2.6252E−03 | 6.7658E−04 |

TABLE 12-2

| Surface number | A18 | A20 | A22 | A24 | A26 | A28 | A30 |
|---|---|---|---|---|---|---|---|
| S1 | −5.9386E−08 | 1.0417E−09 | 0.0000E+00 | 0.0000E+00 | 0.0000E+00 | 0.0000E+00 | 0.0000E+00 |
| S2 | 5.1395E+00 | −2.3964E+00 | 8.0272E−01 | −1.8815E−01 | 2.9276E−02 | −2.7146E−03 | 1.1344E−04 |
| S3 | 1.7978E−04 | 0.0000E+00 | 0.0000E+00 | 0.0000E+00 | 0.0000E+00 | 0.0000E+00 | 0.0000E+00 |
| S4 | −3.4359E−01 | 3.6492E−02 | 0.0000E+00 | 0.0000E+00 | 0.0000E+00 | 0.0000E+00 | 0.0000E+00 |
| S5 | 0.0000E+00 | 0.0000E+00 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 | 0.0000E+00 | 0.0000E+00 |
| S7 | 0.0000E+00 | 0.0000E+00 | 0.0000E+00 | 0.0000E+00 | 0.0000E+00 | 0.0000E+00 | 0.0000E+00 |
| S8 | −6.4079E+04 | 1.0958E+05 | −1.3450E+05 | 1.1541E+05 | −6.5699E+04 | 2.2282E+04 | −3.4064E+03 |
| S9 | 1.7690E+04 | −2.6634E+04 | 2.8819E+04 | −2.1796E+04 | 1.0923E+04 | −3.2556E+03 | 4.3655E+02 |
| S10 | 8.1828E−04 | 0.0000E+00 | 0.0000E+00 | 0.0000E+00 | 0.0000E+00 | 0.0000E+00 | 0.0000E+00 |
| S11 | 3.0191E−03 | −2.3376E−04 | 0.0000E+00 | 0.0000E+00 | 0.0000E+00 | 0.0000E+00 | 0.0000E+00 |
| S12 | −3.3721E−03 | 2.0204E−04 | 0.0000E+00 | 0.0000E+00 | 0.0000E+00 | 0.0000E+00 | 0.0000E+00 |
| S13 | −7.0892E−03 | 1.0947E−03 | −1.1634E−04 | 8.0951E−06 | −3.3180E−07 | 6.0708E−09 | 0.0000E+00 |
| S14 | −1.1769E−04 | 1.3928E−05 | −1.1076E−06 | 5.6726E−08 | −1.6927E−09 | 2.2387E−11 | 0.0000E+00 |

Figure 12A:
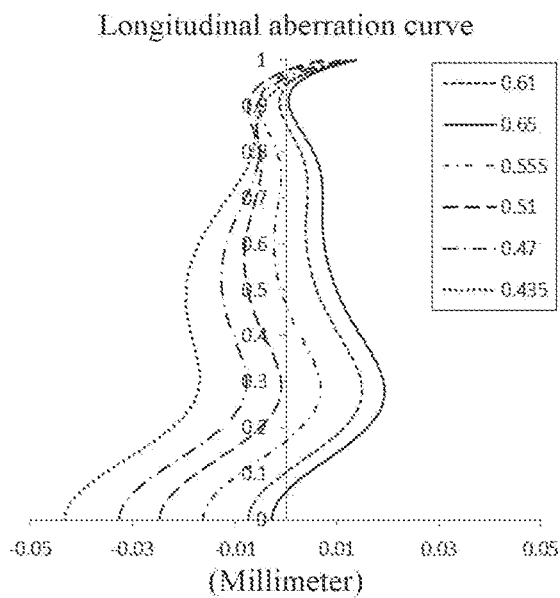
FIGS. 12A-12C respectively illustrate a longitudinal aberration curve, an astigmatic curve and a distortion curve of the camera lens assembly according to Example 6.
Figure 12B:
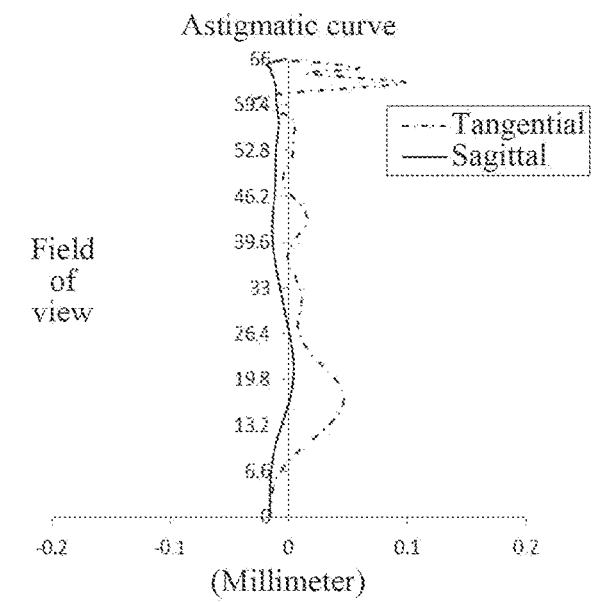
Figure 12C:
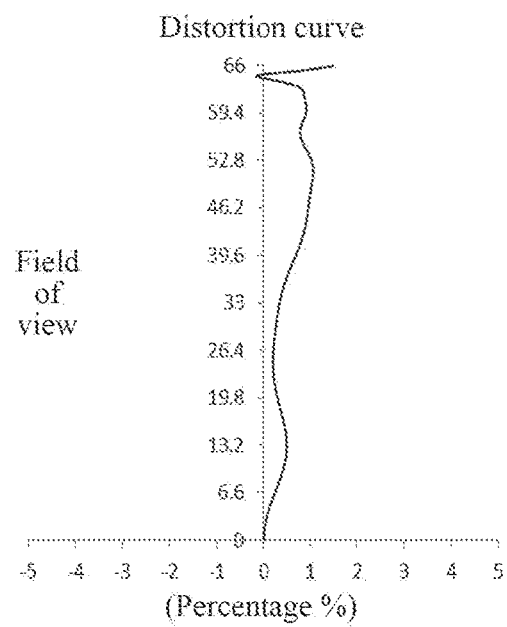

FIG. 12A illustrates the longitudinal aberration curve of the camera lens assembly according to Example 6, representing deviations of focal points converged by light of different wavelengths after passing through the lens assembly. FIG. 12B illustrates the astigmatic curve of the camera lens assembly according to Example 6, representing a curvature of a tangential plane and a curvature of a sagittal plane. FIG. 12C illustrates the distortion curve of the camera lens assembly according to Example 6, representing the amounts of distortion corresponding to different field-of-views. It can be seen from FIG. 12A to FIG. 12C that the camera lens assembly provided in Example 6 can achieve good imaging quality.

Example 7

A camera lens assembly according to Example 7 of the present disclosure is described below with reference to FIG. 13 to FIG. 14C. FIG. 13 illustrates a schematic structural diagram of the camera lens assembly according to Example 7 of the present disclosure.

As shown in FIG. 13, the camera lens assembly from an object side to an image side sequentially includes: a first lens E1, a second lens E2, a third lens E3, a diaphragm STO, a fourth lens E4, a fifth lens E5, a sixth lens E6, a seventh lens E7, an optical filter E8 and an image plane S17.

The first lens E1 has negative refractive power, an object-side surface S1 of the first lens is a concave surface, and an image-side surface S2 of the first lens is a concave surface. The second lens E2 has positive refractive power, an object-side surface S3 of the second lens is a convex surface, and an image-side surface S4 of the second lens is a concave surface. The third lens E3 has positive refractive power, an object-side surface S5 of the third lens is a convex surface, and an image-side surface S6 of the third lens is a concave surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a convex surface. The sixth lens E6 has positive refractive power, an object-side surface S11 of the sixth lens is a convex surface, and an image-side surface S12 of the sixth lens is a convex surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. Light from an object sequentially passes through the surfaces S1 to S16 and is finally imaged on the image plane S17.

In this example, the total effective focal length f of the camera lens assembly is 1.68 mm, and the maximum field-of-view FOV of the camera lens assembly is 131.9.

Table 13 is a table illustrating basic parameters of the camera lens assembly of Example 7, where the units for the radius of curvature, the thickness/distance and the focal length are millimeter (mm). Tables 14-1 and 14-2 show high-order coefficients applicable to each aspheric surface in Example 7, where the surface shape of each aspheric surface may be defined by the formula (1) given in the above Example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | infinite | infinite | | | | |
| S1 | Aspheric | −5.0178 | 0.5676 | 1.54 | 56.00 | −2.86 | −15.4201 |
| S2 | Aspheric | 2.3549 | 0.6729 | | | | 0.5614 |
| S3 | Aspheric | 2.2909 | 0.6323 | 1.67 | 19.20 | 8.74 | 0.0942 |
| S4 | Aspheric | 3.3199 | 0.6032 | | | | −15.5519 |
| S5 | Aspheric | 3.4677 | 0.2753 | 1.54 | 56.00 | 8.88 | 3.3919 |
| S6 | Aspheric | 8.5250 | 0.1121 | | | | 3.7791 |
| STO | Spherical | infinite | 0.0250 | | | | |
| S7 | Aspheric | 5.1072 | 0.8680 | 1.54 | 56.00 | 2.65 | 6.8899 |
| S8 | Aspheric | −1.8959 | 0.1072 | | | | −0.7886 |
| S9 | Aspheric | −2.4529 | 0.3282 | 1.67 | 19.20 | −7.13 | 0.4907 |
| S10 | Aspheric | −5.3402 | 0.2604 | | | | 5.2699 |
| S11 | Aspheric | 180.6773 | 1.0000 | 1.54 | 56.00 | 1.62 | 99.0000 |
| S12 | Aspheric | −0.8877 | 0.0319 | | | | −5.9044 |
| S13 | Aspheric | 4.4421 | 0.5279 | 1.64 | 23.50 | −1.92 | −9.7123 |
| S14 | Aspheric | 0.9240 | 0.6361 | | | | −6.5105 |
| S15 | Spherical | infinite | 0.2100 | 1.52 | 54.50 | | |
| S16 | Spherical | infinite | 0.3785 | | | | |
| S17 | Spherical | infinite | | | | | |

TABLE 14-1

| Surface number | A4 | A6 | A8 | A10 | A12 | A14 | A16 |
|---|---|---|---|---|---|---|---|
| S1 | 4.8364E−02 | −1.6694E−02 | 4.7980E−03 | −1.0026E−03 | 1.4446E−04 | −1.3906E−05 | 8.5883E−07 |
| S2 | −8.1098E−03 | −2.4369E−02 | 2.2056E−01 | −6.8683E−01 | 1.4059E+00 | −2.0077E+00 | 2.0339E+00 |
| S3 | −5.3313E−02 | 5.6790E−02 | 1.5083E−02 | −3.8819E−02 | 2.9833E−02 | −1.4264E−02 | 3.6139E−03 |
| S4 | 1.0742E−01 | −2.2883E−02 | 5.0967E−01 | −1.3968E+00 | 2.1173E+00 | −1.9048E+00 | 9.5558E−01 |
| S5 | 6.1146E−02 | 1.4387E−01 | −9.8797E−01 | 3.2049E+00 | −6.0758E+00 | 5.7546E+00 | −2.0748E+00 |
| S6 | 1.2632E−01 | −1.4526E−01 | 6.6449E−01 | −1.6635E+00 | 1.5649E+00 | 0.0000E+00 | 0.0000E+00 |
| S7 | 3.3223E−02 | −8.8801E−03 | −1.5054E−01 | 3.1991E−01 | −6.7352E−01 | 8.1692E−01 | −4.1665E−01 |
| S8 | −6.5911E−02 | −1.2999E+00 | 1.7984E+01 | −1.7698E+02 | 1.1248E+03 | −4.7559E+03 | 1.3776E+04 |
| S9 | −1.3966E−01 | 2.4615E+00 | −4.0110E+01 | 3.5433E+02 | −2.0791E+03 | 8.5882E+03 | −2.5538E+04 |
| S10 | 1.1535E−01 | −4.4691E−01 | 7.5454E−01 | −6.3020E−01 | 2.4951E−01 | −1.1238E−02 | −2.3401E−02 |
| S11 | 1.2051E−01 | −1.5135E−01 | 6.7598E−02 | 1.0223E−02 | −2.6574E−02 | 1.3962E−02 | −3.8215E−03 |
| S12 | 3.3999E−02 | −5.3423E−02 | 6.8764E−02 | −8.4319E−02 | 6.1007E−02 | −2.4988E−02 | 5.8966E−03 |
| S13 | 2.1901E−01 | −5.9497E−01 | 8.6589E−01 | −8.8245E−01 | 6.2704E−01 | −3.1257E−01 | 1.1043E−01 |
| S14 | 4.9145E−02 | −1.0325E−01 | 9.6092E−02 | −6.3908E−02 | 3.0358E−02 | −1.0142E−02 | 2.3791E−03 |

TABLE 14-2

| Surface number | A18 | A20 | A22 | A24 | A26 | A28 | A30 |
|---|---|---|---|---|---|---|---|
| S1 | −3.0941E−08 | 4.9633E−10 | 0.0000E+00 | 0.0000E+00 | 0.0000E+00 | 0.0000E+00 | 0.0000E+00 |
| S2 | −1.4726E+00 | 7.6264E−01 | −2.8013E−01 | 7.1256E−02 | −1.1937E−02 | 1.1849E−03 | −5.2795E−05 |
| S3 | −3.6371E−04 | 0.0000E+00 | 0.0000E+00 | 0.0000E+00 | 0.0000E+00 | 0.0000E+00 | 0.0000E+00 |
| S4 | −2.4048E−01 | 2.2785E−02 | 0.0000E+00 | 0.0000E+00 | 0.0000E+00 | 0.0000E+00 | 0.0000E+00 |
| S5 | 0.0000E+00 | 0.0000E+00 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 | 0.0000E+00 | 0.0000E+00 |
| S7 | 0.0000E+00 | 0.0000E+00 | 0.0000E+00 | 0.0000E+00 | 0.0000E+00 | 0.0000E+00 | 0.0000E+00 |
| S8 | −2.7726E+04 | 3.8651E+04 | −3.6434E+04 | 2.1900E+04 | −7.2922E+03 | 7.9384E+02 | 1.2189E+02 |
| S9 | 5.5143E+04 | −8.6385E+04 | 9.7032E+04 | −7.6074E+04 | 3.9494E+04 | −1.2192E+04 | 1.6937E+03 |
| S10 | 5.4567E−03 | 0.0000E+00 | 0.0000E+00 | 0.0000E+00 | 0.0000E+00 | 0.0000E+00 | 0.0000E+00 |
| S11 | 5.6969E−04 | −3.8021E−05 | 0.0000E+00 | 0.0000E+00 | 0.0000E+00 | 0.0000E+00 | 0.0000E+00 |
| S12 | −7.5702E−04 | 4.1193E−05 | 0.0000E+00 | 0.0000E+00 | 0.0000E+00 | 0.0000E+00 | 0.0000E+00 |
| S13 | −2.7749E−02 | 4.9190E−03 | −6.0042E−04 | 4.7970E−05 | −2.2562E−06 | 4.7326E−08 | 0.0000E+00 |
| S14 | −3.9192E−04 | 4.5013E−05 | −3.5263E−06 | 1.7956E−07 | −5.3576E−09 | 7.1096E−11 | 0.0000E+00 |

Figure 14C:
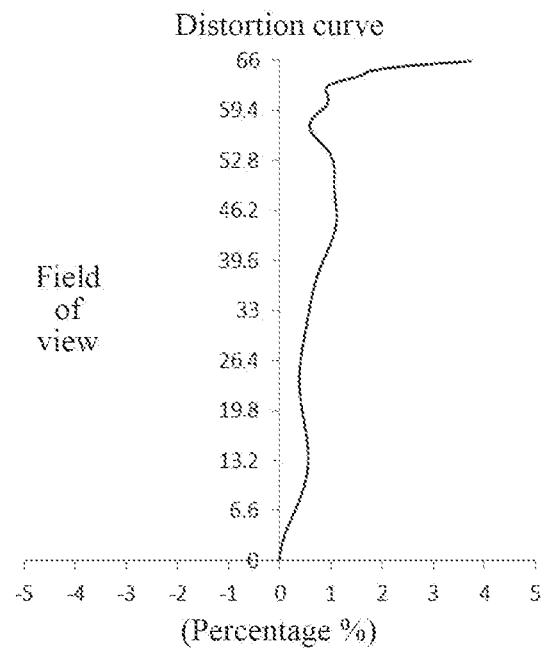

FIG. 14A illustrates the longitudinal aberration curve of the camera lens assembly according to Example 7, representing deviations of focal points converged by light of different wavelengths after passing through the lens assembly. FIG. 14B illustrates the astigmatic curve of the camera lens assembly according to Example 7, representing a curvature of a tangential plane and a curvature of a sagittal plane. FIG. 14C illustrates the distortion curve of the camera lens assembly according to Example 7, representing the amounts of distortion corresponding to different field-ofviews. It can be seen from FIG. 14A to FIG. 14C that the camera lens assembly provided in Example 7 can achieve good imaging quality.

Example 8

Figure 15:
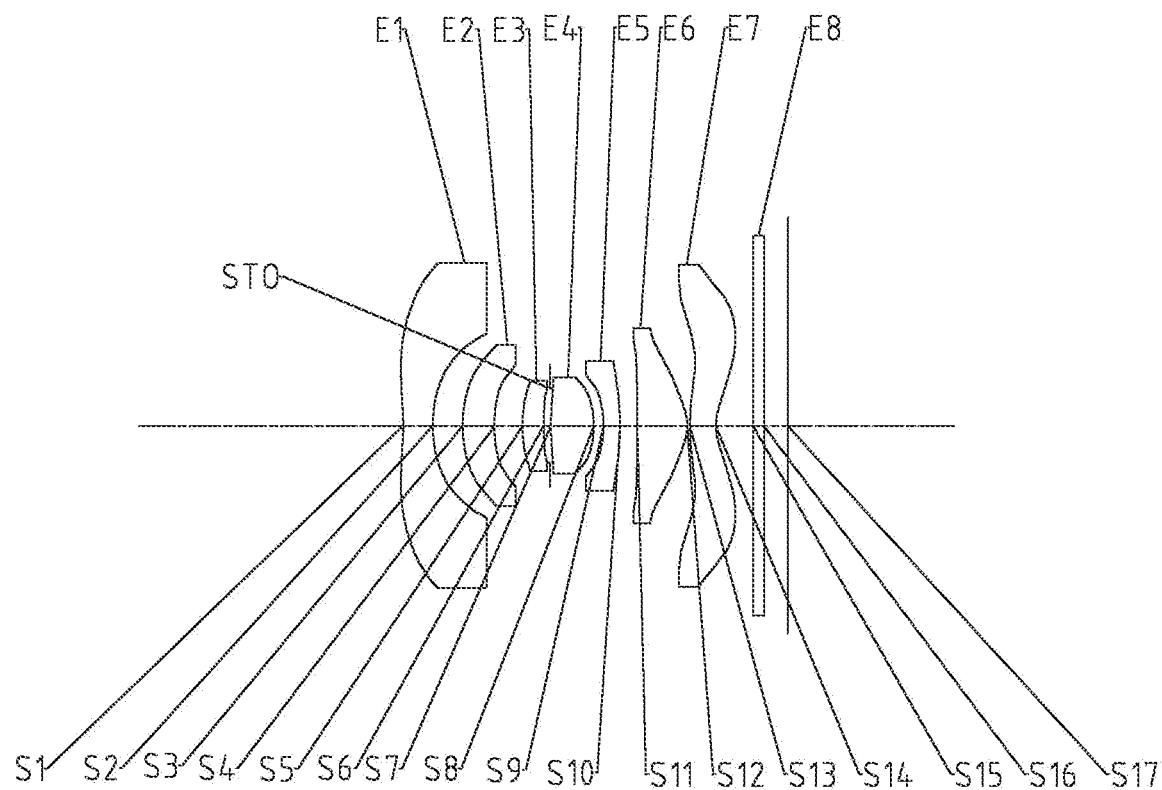
FIG. 15 is a schematic structural diagram illustrating a camera lens assembly according to Example 8 of the present disclosure.

A camera lens assembly according to Example 8 of the present disclosure is described below with reference to FIG. 15 to FIG. 16C. FIG. 15 illustrates a schematic structural diagram of the camera lens assembly according to Example 8 of the present disclosure.

As shown in FIG. 15, the camera lens assembly from an object side to an image side sequentially includes: a first lens E1, a second lens E2, a third lens E3, a diaphragm STO, a fourth lens E4, a fifth lens E5, a sixth lens E6, a seventh lens E7, an optical filter E8 and an image plane S17.

The first lens E1 has negative refractive power, an object-side surface S1 of the first lens is a concave surface, and an image-side surface S2 of the first lens is a concave surface. The second lens E2 has positive refractive power, an object-side surface S3 of the second lens is a convex surface, and an image-side surface S4 of the second lens is a concave surface. The third lens E3 has positive refractive power, an object-side surface S5 of the third lens is a convex surface, and an image-side surface S6 of the third lens is a concave surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a convex surface. The sixth lens E6 has positive refractive power, an object-side surface S11 of the sixth lens is a concave surface, and an image-side surface S12 of the sixth lens is a convex surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. Light from an object sequentially passes through the surfaces S1 to S16 and is finally imaged on the image plane S17.

In this example, the total effective focal length f of the camera lens assembly is 2.02 mm, and the maximum field-of-view FOV of the camera lens assembly is 120.0.

Table 15 is a table illustrating basic parameters of the camera lens assembly of Example 8, where the units for the radius of curvature, the thickness/distance and the focal length are millimeter (mm). Tables 16-1 and 16-2 show high-order coefficients applicable to each aspheric surface in Example 8, where the surface shape of each aspheric surface may be defined by the formula (1) given in the above Example 1.

TABLE 15

| Surface number | Surface type | Radius of curvature | Thickness/ Distance | Refractive index | Abbe number | Focal length | Conic coefficient |
|---|---|---|---|---|---|---|---|
| OBJ | Spherical | infinite | infinite | | | | |
| S1 | Aspheric | −5.0409 | 0.5774 | 1.54 | 56.00 | −2.91 | −14.1838 |
| S2 | Aspheric | 2.4171 | 0.5920 | | | | 0.5612 |
| S3 | Aspheric | 2.3208 | 0.6243 | 1.67 | 19.20 | 9.35 | 0.1078 |
| S4 | Aspheric | 3.2647 | 0.5591 | | | | −11.2554 |
| S5 | Aspheric | 3.0249 | 0.4145 | 1.54 | 56.00 | 8.00 | 2.9653 |
| S6 | Aspheric | 6.9192 | 0.1188 | | | | −2.0548 |
| STO | Spherical | infinite | 0.0250 | | | | |
| S7 | Aspheric | 5.7653 | 0.8521 | 1.54 | 56.00 | 2.71 | 3.5220 |
| S8 | Aspheric | −1.8849 | 0.1904 | | | | −0.7064 |
| S9 | Aspheric | −2.2956 | 0.3273 | 1.67 | 19.20 | −7.25 | 0.6303 |
| S10 | Aspheric | −4.6217 | 0.3405 | | | | 4.2594 |
| S11 | Aspheric | −8.9588 | 0.9859 | 1.54 | 56.00 | 1.54 | −21.9019 |
| S12 | Aspheric | −0.8003 | 0.0503 | | | | −5.1065 |
| S13 | Aspheric | 5.6258 | 0.5126 | 1.64 | 23.50 | −1.63 | −7.0972 |
| S14 | Aspheric | 0.8537 | 0.7387 | | | | −7.8649 |
| S15 | Spherical | infinite | 0.2100 | 1.52 | 54.50 | | |
| S16 | Spherical | infinite | 0.4810 | | | | |
| S17 | Spherical | infinite | | | | | |

TABLE 16-1

| Surface number | A4 | A6 | A8 | A10 | A12 | A14 | A16 |
|---|---|---|---|---|---|---|---|
| S1 | 5.7704E−02 | −2.5506E−02 | 9.6709E−03 | −2.5672E−03 | 4.4906E−04 | −5.0520E−05 | 3.5250E−06 |
| S2 | −9.2861E−02 | 6.4155E−01 | −2.5656E+00 | 6.5745E+00 | −1.1369E+01 | 1.3812E+01 | −1.2067E+01 |
| S3 | −5.5502E−02 | 5.6375E−02 | −4.9102E−04 | 1.1997E−02 | −2.6487E−02 | 1.4600E−02 | −3.3772E−03 |
| S4 | 1.0885E−01 | 1.3860E−02 | 1.7987E−01 | −1.5737E−01 | −1.8946E−01 | 4.8328E−01 | −4.6335E−01 |
| S5 | 5.2833E−02 | 1.3334E−01 | −7.1473E−01 | 1.8200E+00 | −2.8188E+00 | 2.2104E+00 | −6.4935E−01 |
| S6 | 1.1586E−01 | −1.0792E−01 | 7.3294E−01 | −5.8749E+00 | 3.6646E+01 | −1.4141E+02 | 3.1366E+02 |
| S7 | 2.7791E−02 | 7.5364E−02 | −1.3268E+00 | 8.8058E+00 | −3.6887E+01 | 9.3386E+01 | −1.3722E+02 |
| S8 | −4.9385E−02 | −2.0043E+00 | 2.6428E+01 | −2.4848E+02 | 1.6249E+03 | −7.4831E+03 | 2.4626E+04 |
| S9 | −1.0531E−01 | 1.0168E+00 | −2.1637E+01 | 2.0672E+02 | −1.2657E+03 | 5.3945E+03 | −1.6467E+04 |
| S10 | 1.0590E−01 | −4.0272E−01 | 6.9589E−01 | −5.5808E−01 | 1.6136E−01 | 5.7064E−02 | −5.1725E−02 |
| S11 | 1.3606E−01 | −1.3016E−01 | −2.2932E−02 | 1.4611E−01 | −1.4467E−01 | 7.8100E−02 | −2.5250E−02 |
| S12 | 3.7958E−02 | −5.8318E−02 | 8.2218E−02 | −1.0426E−01 | 7.3034E−02 | −2.8087E−02 | 6.0773E−03 |

TABLE 16-1-continued

| Surface number | A4 | A6 | A8 | A10 | A12 | A14 | A16 |
|---|---|---|---|---|---|---|---|
| S13 | 1.5601E−01 | −4.0588E−01 | 5.3497E−01 | −4.6930E−01 | 2.7892E−01 | −1.1480E−01 | 3.3363E−02 |
| S14 | 5.2167E−02 | −1.7829E−01 | 2.3388E−01 | −1.8556E−01 | 9.4744E−02 | −3.2323E−02 | 7.5012E−03 |

TABLE 16-2

| Surface number | A18 | A20 | A22 | A24 | A26 | A28 | A30 |
|---|---|---|---|---|---|---|---|
| S1 | −1.3913E−07 | 2.3801E−09 | 0.0000E+00 | 0.0000E+00 | 0.0000E+00 | 0.0000E+00 | 0.0000E+00 |
| S2 | 7.6724E+00 | −3.5553E+00 | 1.1880E+00 | −2.7872E−01 | 4.3539E−02 | −4.0636E−03 | 1.7132E−04 |
| S3 | 2.8328E−04 | 0.0000E+00 | 0.0000E+00 | 0.0000E+00 | 0.0000E+00 | 0.0000E+00 | 0.0000E+00 |
| S4 | 2.1639E−01 | −3.9310E−02 | 0.0000E+00 | 0.0000E+00 | 0.0000E+00 | 0.0000E+00 | 0.0000E+00 |
| S5 | 0.0000E+00 | 0.0000E+00 | 0.0000E+00 | 0.0000E+00 | 0.0000E+00 | 0.0000E+00 | 0.0000E+00 |
| S6 | −3.6621E+02 | 1.7609E+02 | 0.0000E+00 | 0.0000E+00 | 0.0000E+00 | 0.0000E+00 | 0.0000E+00 |
| S7 | 1.0524E+02 | −3.0961E+01 | 0.0000E+00 | 0.0000E+00 | 0.0000E+00 | 0.0000E+00 | 0.0000E+00 |
| S8 | −5.8429E+04 | 9.9984E+04 | −1.2210E+05 | 1.0369E+05 | −5.8122E+04 | 1.9322E+04 | −2.8829E+03 |
| S9 | 3.6399E+04 | −5.8260E+04 | 6.6777E+04 | −5.3371E+04 | 2.8224E+04 | −8.8703E+03 | 1.2537E+03 |
| S10 | 1.0348E−02 | 0.0000E+00 | 0.0000E+00 | 0.0000E+00 | 0.0000E+00 | 0.0000E+00 | 0.0000E+00 |
| S11 | 4.5874E−03 | −3.6161E−04 | 0.0000E+00 | 0.0000E+00 | 0.0000E+00 | 0.0000E+00 | 0.0000E+00 |
| S12 | −7.0085E−04 | 3.3739E−05 | 0.0000E+00 | 0.0000E+00 | 0.0000E+00 | 0.0000E+00 | 0.0000E+00 |
| S13 | −6.9033E−03 | 1.0115E−03 | −1.0254E−04 | 6.8377E−06 | −2.6968E−07 | 4.7636E−09 | 0.0000E+00 |
| S14 | −1.1806E−03 | 1.2195E−04 | −7.4500E−06 | 1.6457E−07 | 9.6081E−09 | −7.5159E−10 | 1.5435E−11 |

Figure 16A:
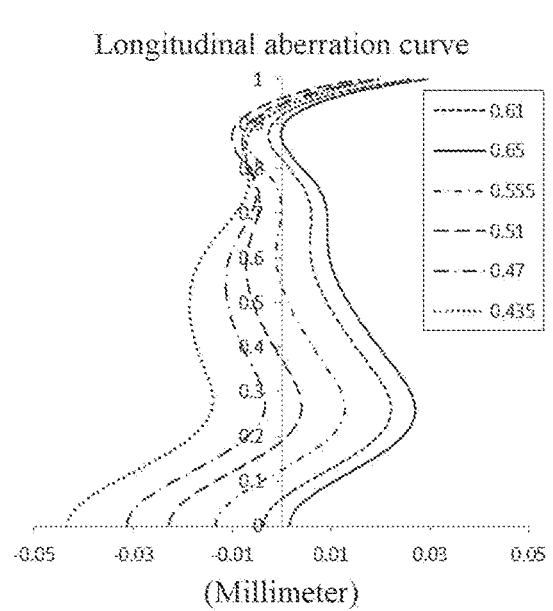
FIGS. 16A-16C respectively illustrate a longitudinal aberration curve, an astigmatic curve and a distortion curve of the camera lens assembly according to Example 8.
Figure 16B:
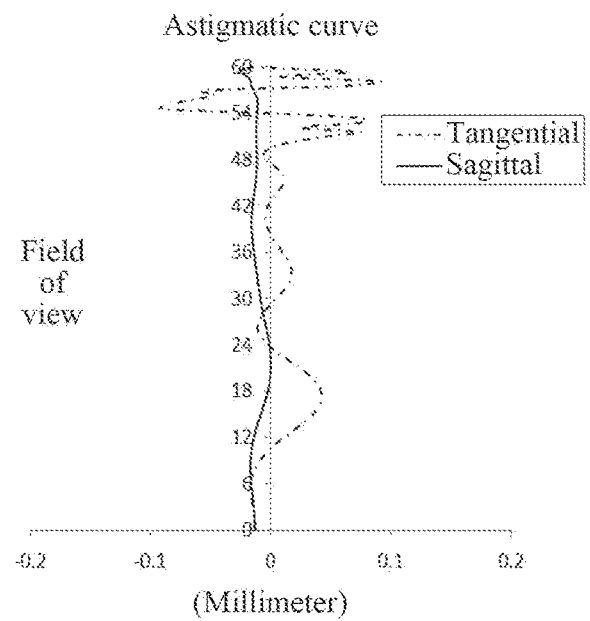
Figure 16C:
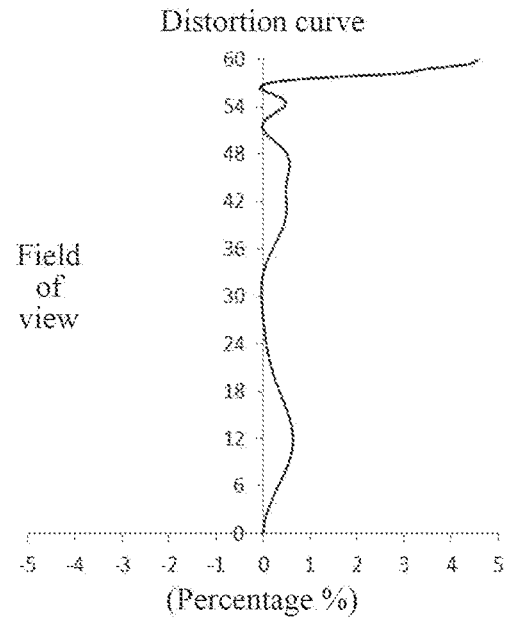

FIG. 16A illustrates the longitudinal aberration curve of the camera lens assembly according to Example 8, representing deviations of focal points converged by light of different wavelengths after passing through the lens assembly. FIG. 16B illustrates the astigmatic curve of the camera lens assembly according to Example 8, representing a curvature of a tangential plane and a curvature of a sagittal plane. FIG. 16C illustrates the distortion curve of the camera lens assembly according to Example 8, representing the amounts of distortion corresponding to different field-of-views. It can be seen from FIG. 16A to FIG. 16C that the camera lens assembly provided in Example 8 can achieve good imaging quality.

Example 9

Figure 17:
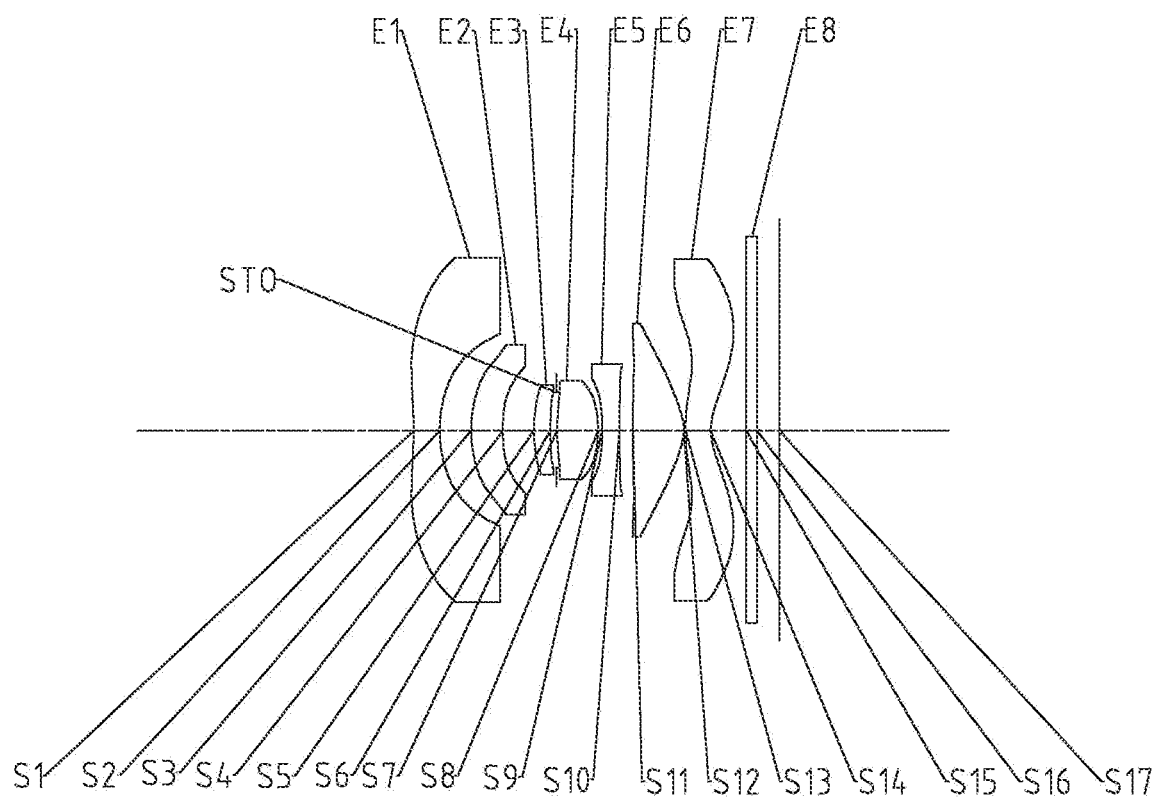
FIG. 17 is a schematic structural diagram illustrating a camera lens assembly according to Example 9 of the present disclosure.

A camera lens assembly according to Example 9 of the present disclosure is described below with reference to FIG. 17 to FIG. 18C. FIG. 17 illustrates a schematic structural diagram of the camera lens assembly according to Example 9 of the present disclosure.

As shown in FIG. 17, the camera lens assembly from an object side to an image side sequentially includes: a first lens E1, a second lens E2, a third lens E3, a diaphragm STO, a fourth lens E4, a fifth lens E5, a sixth lens E6, a seventh lens E7, an optical filter E8 and an image plane S17.

The first lens E1 has negative refractive power, an object-side surface S1 of the first lens is a concave surface, and an image-side surface S2 of the first lens is a concave surface. The second lens E2 has positive refractive power, an object-side surface S3 of the second lens is a convex surface, and an image-side surface S4 of the second lens is a concave surface. The third lens E3 has positive refractive power, an object-side surface S5 of the third lens is a convex surface, and an image-side surface S6 of the third lens is a concave surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a concave surface. The sixth lens E6 has positive refractive power, an object-side surface S11 of the sixth lens is a concave surface, and an image-side surface S12 of the sixth lens is a convex surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. Light from an object sequentially passes through the surfaces S1 to S16 and is finally imaged on the image plane S17.

In this example, the total effective focal length f of the camera lens assembly is 1.78 mm, and the maximum field-of-view FOV of the camera lens assembly is 129.6.

Table 17 is a table illustrating basic parameters of the camera lens assembly of Example 9, where the units for the radius of curvature, the thickness/distance and the focal length are millimeter (mm). Tables 18-1 and 18-2 show high-order coefficients applicable to each aspheric surface in Example 9, where the surface shape of each aspheric surface may be defined by the formula (1) given in the above Example 1.

TABLE 17

| Surface number | Surface type | Radius of curvature | Thickness/ Distance | Material Refractive index | Material Abbe number | Focal length | Conic coefficient |
|---|---|---|---|---|---|---|---|
| OBJ | Spherical | infinite | infinite | | | | |
| S1 | Aspheric | −5.0345 | 0.5088 | 1.54 | 56.00 | −2.92 | −14.4619 |
| S2 | Aspheric | 2.4157 | 0.6258 | | | | 0.5760 |

TABLE 17-continued

| Surface number | Surface type | Radius of curvature | Thickness/ Distance | Material Refractive index | Abbe number | Focal length | Conic coefficient |
|---|---|---|---|---|---|---|---|
| S3 | Aspheric | 2.3570 | 0.6248 | 1.67 | 19.20 | 9.63 | 0.0922 |
| S4 | Aspheric | 3.2957 | 0.6208 | | | | -13.6436 |
| S5 | Aspheric | 3.3836 | 0.3222 | 1.54 | 56.00 | 8.70 | 3.0133 |
| S6 | Aspheric | 8.2137 | 0.1111 | | | | -6.1202 |
| STO | Spherical | infinite | 0.0250 | | | | |
| S7 | Aspheric | 4.6868 | 0.8144 | 1.54 | 56.00 | 3.07 | 3.8456 |
| S8 | Aspheric | -2.4523 | 0.0773 | | | | -0.6860 |
| S9 | Aspheric | -6.0731 | 0.3443 | 1.67 | 19.20 | -9.11 | -0.9587 |
| S10 | Aspheric | 1670277.0415 | 0.2681 | | | | -99.0000 |
| S11 | Aspheric | -44.8542 | 1.0089 | 1.54 | 56.00 | 1.58 | 98.9038 |
| S12 | Aspheric | -0.8544 | 0.0270 | | | | -5.1642 |
| S13 | Aspheric | 3.9997 | 0.5036 | 1.64 | 23.50 | -1.94 | -10.0828 |
| S14 | Aspheric | 0.9044 | 0.7063 | | | | -7.0212 |
| S15 | Spherical | infinite | 0.2100 | 1.52 | 54.50 | | |
| S16 | Spherical | infinite | 0.4488 | | | | |
| S17 | Spherical | infinite | | | | | |

TABLE 18-1

| Surface number | A4 | A6 | A8 | A10 | A12 | A14 | A16 |
|---|---|---|---|---|---|---|---|
| S1 | 5.2091E-02 | -1.9476E-02 | 6.3908E-03 | -1.8352E-03 | 5.7374E-04 | -1.9344E-04 | 5.5006E-05 |
| S2 | -3.8559E-02 | 1.9790E-01 | -7.9758E-01 | 2.2241E+00 | -4.1263E+00 | 5.2753E+00 | -4.7807E+00 |
| S3 | -7.4153E-02 | 1.2841E-01 | 6.9374E-02 | -1.1693E+00 | 4.0771E+00 | -8.1217E+00 | 1.0614E+01 |
| S4 | 5.6542E-02 | 7.0929E-01 | -5.6622E+00 | 3.3477E+01 | -1.3450E+02 | 3.7667E+02 | -7.5098E+02 |
| S5 | 1.1272E-02 | 1.7857E+00 | -3.2495E+01 | 3.7601E+02 | -2.9594E+03 | 1.6376E+04 | -6.5056E+04 |
| S6 | 1.5798E-01 | -2.0098E+00 | 5.5496E+01 | -1.0002E+03 | 1.1986E+04 | -9.9018E+04 | 5.7807E+05 |
| S7 | 1.7857E-02 | 1.5240E+00 | -5.7158E+01 | 1.1589E+03 | -1.4644E+04 | 1.2321E+05 | -7.1862E+05 |
| S8 | -1.4501E-01 | 6.3729E-01 | -1.0679E+01 | 7.0486E+01 | -2.4726E+02 | 4.0541E+02 | 2.5030E+02 |
| S9 | -4.7706E-02 | -2.7212E-01 | -1.9202E+00 | 1.5223E+01 | -3.6981E+01 | -4.2889E+00 | 2.3710E+02 |
| S10 | 1.9358E-01 | -1.7952E+00 | 1.1531E+01 | -5.3362E+01 | 1.7419E+02 | -4.0349E+02 | 6.7317E+02 |
| S11 | 1.2267E-01 | -3.3868E-01 | 1.1388E+00 | -3.1993E+00 | 6.0850E+00 | -7.9024E+00 | 7.2247E+00 |
| S12 | 8.7979E-02 | -3.7778E-01 | 7.7485E-01 | -7.4303E-01 | 5.8809E-02 | 6.3743E-01 | -7.6107E-01 |
| S13 | 1.9888E-01 | -6.5285E-01 | 1.1250E+00 | -1.2675E+00 | 9.5872E-01 | -5.0152E-01 | 1.8574E-01 |
| S14 | 5.6744E-02 | -1.6582E-01 | 2.2540E-01 | -1.9785E-01 | 1.1481E-01 | -4.5412E-02 | 1.2564E-02 |

TABLE 18-2

| Surface number | A18 | A20 | A22 | A24 | A26 | A28 | A30 |
|---|---|---|---|---|---|---|---|
| S1 | -1.1589E-05 | 1.7553E-06 | -1.8911E-07 | 1.4185E-08 | -7.0569E-10 | 2.0957E-11 | -2.8133E-13 |
| S2 | 3.1228E+00 | -1.4769E+00 | 5.0117E-01 | -1.1892E-01 | 1.8721E-02 | -1.7554E-03 | 7.4147E-05 |
| S3 | -9.5777E+00 | 6.0790E+00 | -2.7108E+00 | 8.3202E-01 | -1.6745E-01 | 1.9898E-02 | -1.0583E-03 |
| S4 | 1.0782E+03 | -1.1168E+03 | 8.2670E+02 | -4.2640E+02 | 1.4556E+02 | -2.9559E+01 | 2.7036E+00 |
| S5 | 1.8746E+05 | -3.9181E+05 | 5.8738E+05 | -6.1491E+05 | 4.2646E+05 | -1.7594E+05 | 3.2669E+04 |
| S6 | -2.4179E+06 | 7.2671E+06 | -1.5554E+07 | 2.3124E+07 | -2.2686E+07 | 1.3203E+07 | -3.4522E+06 |
| S7 | 2.9699E+06 | -8.7628E+06 | 1.8340E+07 | -2.6596E+07 | 2.5407E+07 | -1.4378E+07 | 3.6510E+06 |
| S8 | -2.8327E+03 | 6.7477E+03 | -8.7911E+03 | 6.7737E+03 | -2.8929E+03 | 5.2020E+02 | 6.1555E+00 |
| S9 | -6.0177E+02 | 6.7895E+02 | -1.8953E+02 | -4.2258E+02 | 5.4619E+02 | -2.7215E+02 | 5.1946E+01 |
| S10 | -8.1687E+02 | 7.2139E+02 | -4.5862E+02 | 2.0438E+02 | -6.0571E+01 | 1.0718E+01 | -8.5653E-01 |
| S11 | -4.7406E+00 | 2.2457E+00 | -7.6197E-01 | 1.8061E-01 | -2.8397E-02 | 2.6598E-03 | -1.1227E-04 |
| S12 | 4.7088E-01 | -1.8144E-01 | 4.5037E-02 | -7.0167E-03 | 6.2328E-04 | -2.3648E-05 | -6.3606E-08 |
| S13 | -4.9356E-02 | 9.4376E-03 | -1.2867E-03 | 1.2196E-04 | -7.6348E-06 | 2.8367E-07 | -4.7364E-09 |
| S14 | -2.4709E-03 | 3.4708E-04 | -3.4555E-05 | 2.3800E-06 | -1.0779E-07 | 2.8859E-09 | -3.4590E-11 |

Figure 18A:
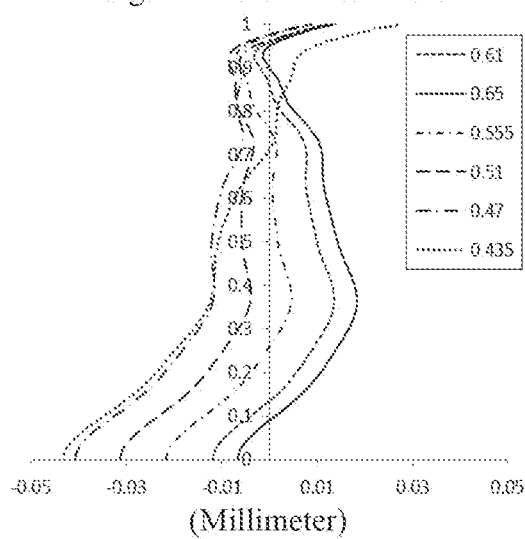
FIGS. 18A-18C respectively illustrate a longitudinal aberration curve, an astigmatic curve and a distortion curve of the camera lens assembly according to Example 9.
Figure 18B:
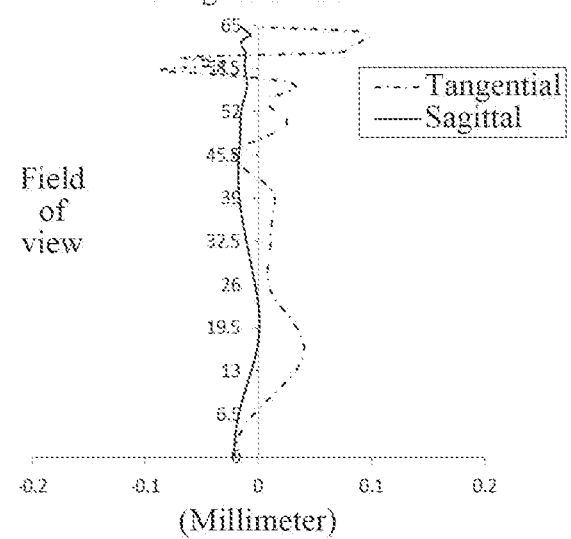
Figure 18C:
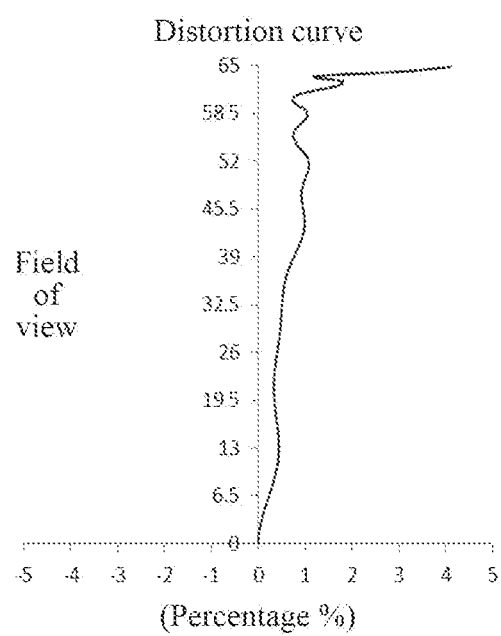

FIG. 18A illustrates the longitudinal aberration curve of the camera lens assembly according to Example 9, representing deviations of focal points converged by light of different wavelengths after passing through the lens assembly. FIG. 18B illustrates the astigmatic curve of the camera lens assembly according to Example 9, representing a curvature of a tangential plane and a curvature of a sagittal plane. FIG. 18C illustrates the distortion curve of the camera lens assembly according to Example 9, representing the amounts of distortion corresponding to different field-of-views. It can be seen from FIG. 18A to FIG. 18C that the camera lens assembly provided in Example 9 can achieve good imaging quality.

In view of the above, examples 1 to 9 respectively satisfy the relationship shown in Table 19.

TABLE 19

| Conditional | Example | | | | | | | | |
|---|---|---|---|---|---|---|---|---|---|
| | 1 | 2 | 3 | 4 | 5 | 6 | 7 | 8 | 9 |
| TTL × ImgH/f (mm) | 16.15 | 16.75 | 16.41 | 17.60 | 16.35 | 16.61 | 17.27 | 15.08 | 16.32 |
| \|DIST0.8F\| (%) | 0.12 | 0.18 | 0.36 | 0.27 | 0.27 | 1.00 | 0.95 | 0.35 | 0.97 |
| f/TAN(Semi-FOV) (mm) | 0.84 | 0.79 | 0.86 | 0.69 | 0.81 | 0.78 | 0.75 | 1.16 | 0.83 |
| ImgH/EPD | 4.35 | 4.37 | 4.34 | 4.49 | 4.31 | 4.38 | 4.48 | 4.13 | 4.24 |
| SD/TTL | 0.45 | 0.45 | 0.45 | 0.46 | 0.45 | 0.43 | 0.44 | 0.43 | 0.42 |
| ΣAT/TTL | 0.32 | 0.31 | 0.31 | 0.32 | 0.31 | 0.24 | 0.25 | 0.25 | 0.24 |
| f1/f | −1.94 | −2.06 | −1.92 | −2.05 | −1.95 | −1.66 | −1.71 | −1.45 | −1.64 |
| DT11/DTS | 5.07 | 5.02 | 5.07 | 5.07 | 4.93 | 4.99 | 5.25 | 4.51 | 4.77 |
| f/R3 + f/R4 | 1.04 | 0.95 | 1.03 | 0.87 | 1.01 | 1.29 | 1.24 | 1.49 | 1.29 |
| ΣAT/T34 | 13.03 | 13.03 | 12.68 | 13.80 | 12.75 | 12.79 | 13.22 | 13.05 | 12.90 |
| f/R8 | −1.26 | −1.20 | −1.30 | −1.13 | −1.21 | −0.95 | −0.88 | −1.07 | −0.72 |
| (R7 − R8)/(R7 + R8) | 2.00 | 2.08 | 2.02 | 2.09 | 2.05 | 2.06 | 2.18 | 1.97 | 3.19 |
| CT5/f5 | −0.04 | −0.05 | −0.07 | −0.05 | −0.04 | −0.04 | −0.05 | −0.05 | −0.04 |
| f/CT6 | 2.33 | 2.27 | 2.23 | 2.08 | 2.34 | 1.77 | 1.68 | 2.04 | 1.76 |
| T67/f | 0.02 | 0.03 | 0.04 | 0.04 | 0.02 | 0.01 | 0.02 | 0.02 | 0.02 |

The present disclosure further provides an imaging apparatus, having an electronic photosensitive element, which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the camera lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens assembly, along an optical axis from an object side to an image side sequentially comprising:
    a first lens having negative refractive power;
    a second lens having refractive power;
    a third lens having refractive power;
    a fourth lens having positive refractive power;
    a fifth lens having negative refractive power;
    a sixth lens having positive refractive power; and
    a seventh lens having negative refractive power;
    wherein a total number of lenses in the camera lens assembly is seven;
    wherein, a distance TTL from an object-side surface of the first lens to an image plane of the camera lens assembly on the optical axis, a half of a diagonal length ImgH of an effective pixel area of the camera lens assembly and a total effective focal length f of the camera lens assembly satisfy: 15 mm<TTL×ImgH/f<18 mm; and
    a distortion DIST0.8F of the camera lens assembly at 80% of a total field-of-view satisfies: |DIST0.8F|<2%.

2. The camera lens assembly according to claim 1, wherein an effective focal length f1 of the first lens and the total effective focal length f of the camera lens assembly satisfy: −3<f1/f<0.

3. The camera lens assembly according to claim 1, wherein the total effective focal length f of the camera lens assembly, a radius of curvature R3 of an object-side surface of the second lens, and a radius of curvature R4 of an image-side surface of the second lens satisfy: 0<f/R3+f/R4<2.

4. The camera lens assembly according to claim 1, wherein a sum of spaced intervals ΣAT between any two adjacent lenses from the first lens to the seventh lens on the optical axis and a spaced interval T34 between the third lens and the fourth lens on the optical axis satisfy: 10<ΣAT/T34<15.

5. The camera lens assembly according to claim 1, wherein the total effective focal length f of the camera lens assembly and a radius of curvature R8 of an image-side surface of the fourth lens satisfy: −2<f/R8<0.

6. The camera lens assembly according to claim 1, wherein a radius of curvature R7 of an object-side surface of the fourth lens and a radius of curvature R8 of an image-side surface of the fourth lens satisfy: 1<(R7−R8)/(R7+R8)<4.

7. The camera lens assembly according to claim 1, wherein an effective focal length f5 of the fifth lens and a center thickness CT5 of the fifth lens on the optical axis satisfy: −1<CT5/f5<0.

8. The camera lens assembly according to claim 1, wherein the total effective focal length f of the camera lens assembly and a center thickness CT6 of the sixth lens on the optical axis satisfy: 1<f/CT6<3.

9. The camera lens assembly according to claim 1, wherein the total effective focal length f of the camera lens assembly and a spaced interval T67 between the sixth lens and the seventh lens on the optical axis satisfy: 0<T67/f<0.05.

10. The camera lens assembly according to claim 1, wherein the camera lens assembly further comprises a diaphragm arranged between the third lens and the fourth lens, and
    an effective radius DTS of the diaphragm and a maximum effective radius DT11 of the object-side surface of the first lens satisfy: 4<DT11/DTS<6.

11. The camera lens assembly according to claim 10, wherein a distance SD from the diaphragm to an image-side surface of the seventh lens on the optical axis and the distance TTL from the object-side surface of the first lens to the image plane of the camera lens assembly on the optical axis satisfy: 0.4<SD/TTL<0.6.

12. The camera lens assembly according to claim 1, wherein a half of a maximum field-of-view Semi-FOV of the camera lens assembly satisfies: 60°<Semi-FOV<75°.

13. The camera lens assembly according to claim 1, wherein the total effective focal length f of the camera lens assembly and a half of a maximum field-of-view Semi-FOV of the camera lens assembly satisfy: 0 mm<f/TAN (Semi-FOV)<2 mm.

14. The camera lens assembly according to claim 1, wherein the half of the diagonal length ImgH of the effective pixel area on the image plane of the camera lens assembly and an entrance pupil diameter EPD of the camera lens assembly satisfy: 3<ImgH/EPD<5.

15. The camera lens assembly according to claim 1, wherein a sum of spaced intervals ΣAT between any two adjacent lenses from the first lens to the seventh lens on the optical axis and the distance TTL from the object-side surface of the first lens to the image plane of the camera lens assembly on the optical axis satisfy: 0<ΣAT/TTL<0.5.

16. A camera lens assembly, along an optical axis from an object side to an image side sequentially comprising:
   a first lens having negative refractive power;
   a second lens having refractive power;
   a third lens having refractive power;
   a diaphragm;
   a fourth lens having positive refractive power;
   a fifth lens having negative refractive power;
   a sixth lens having positive refractive power; and
   a seventh lens having negative refractive power;
   wherein a total number of lenses in the camera lens assembly is seven;
   wherein, an effective radius DTS of the diaphragm and a maximum effective radius DT11 of an object-side surface of the first lens satisfy: 4<DT11/DTS<6; and
   a distortion DIST0.8F of the camera lens assembly at 80% of a total field-of-view satisfies: |DIST0.8F|<2%.

17. The camera lens assembly according to claim 16, wherein an effective focal length f1 of the first lens and a total effective focal length f of the camera lens assembly satisfy: −3<f1/f<0.

18. The camera lens assembly according to claim 17, wherein a distance TTL from the object-side surface of the first lens to an image plane of the camera lens assembly on the optical axis, a half of a diagonal length ImgH of an effective pixel area of the camera lens assembly and the total effective focal length f of the camera lens assembly satisfy: 15 mm<TTL×ImgH/f<18 mm.

19. The camera lens assembly according to claim 16, wherein a total effective focal length f of the camera lens assembly, a radius of curvature R3 of an object-side surface of the second lens, and a radius of curvature R4 of an image-side surface of the second lens satisfy: 0<f/R3+f/R4<2.

20. The camera lens assembly according to claim 16, wherein a sum of spaced intervals ΣAT between any two adjacent lenses from the first lens to the seventh lens on the optical axis and a spaced interval T34 between the third lens and the fourth lens on the optical axis satisfy: 10<ΣAT/T34<15.

* * * * *